(12) United States Patent
Strand et al.

(10) Patent No.: US 11,208,520 B2
(45) Date of Patent: *Dec. 28, 2021

(54) ISOCYANATE-MODIFIED RIGID THERMOPLASTIC POLYMER COMPOSITIONS

(71) Applicant: Eastman Chemical Company, Kingsport, TN (US)

(72) Inventors: Marc Alan Strand, Kingsport, TN (US); Thomas Joseph Pecorini, Kingsport, TN (US); Patricia Hill-Wilder, Rogersville, TN (US); Tabatha Stearns, Bristol, TN (US); Ross W. Yost, Bristol, TN (US); Jason Christopher Jenkins, Kingsport, TN (US); Anne Martine Jackson, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 17 days.

This patent is subject to a terminal disclaimer.

(21) Appl. No.: 16/077,565

(22) PCT Filed: Feb. 15, 2017

(86) PCT No.: PCT/US2017/017866
§ 371 (c)(1),
(2) Date: Aug. 13, 2018

(87) PCT Pub. No.: WO2017/146949
PCT Pub. Date: Aug. 31, 2017

(65) Prior Publication Data
US 2019/0071532 A1   Mar. 7, 2019

Related U.S. Application Data

(60) Provisional application No. 62/298,535, filed on Feb. 23, 2016, provisional application No. 62/327,237, filed on Apr. 25, 2016.

(51) Int. Cl.

| | |
|---|---|
| *C08G 18/32* | (2006.01) |
| *C08G 18/66* | (2006.01) |
| *C08G 18/76* | (2006.01) |
| *C08G 18/42* | (2006.01) |
| *C08G 18/46* | (2006.01) |
| *C08G 18/08* | (2006.01) |
| *C08G 63/16* | (2006.01) |

(52) U.S. Cl.
CPC ..... *C08G 18/3212* (2013.01); *C08G 18/0895* (2013.01); *C08G 18/3215* (2013.01); *C08G 18/4202* (2013.01); *C08G 18/4213* (2013.01); *C08G 18/4227* (2013.01); *C08G 18/4676* (2013.01); *C08G 18/664* (2013.01); *C08G 18/7671* (2013.01); *C08G 63/16* (2013.01)

(58) Field of Classification Search
CPC .......... C08G 18/3212; C08G 63/16; C08G 18/0895; C08G 18/4202; C08G 18/4676; C08G 18/4227; C08G 18/4213; C08G 18/3215; C08G 18/7671; C08G 18/664

See application file for complete search history.

(56) References Cited

U.S. PATENT DOCUMENTS

| | | |
|---|---|---|
| 3,038,884 A | 6/1962 | Martin et al. |
| 3,161,665 A | 12/1964 | Martin |
| 3,211,585 A | 10/1965 | Meyer et al. |
| 3,220,961 A | 11/1965 | Friedman |
| 3,246,051 A | 4/1966 | Friedman |
| 3,377,409 A | 4/1968 | McConnell et al. |
| 3,386,942 A | 6/1968 | Bell et al. |
| 3,402,150 A | 9/1968 | Gardikes et al. |
| 3,498,940 A | 3/1970 | Laganis |
| 3,547,893 A | 12/1970 | McConnell et al. |
| 3,856,830 A | 12/1974 | Kuehn |
| 3,932,360 A | 1/1976 | Cerankowski et al. |
| 3,954,714 A | 5/1976 | Kuehn |
| 5,654,347 A | 8/1997 | Khemani et al. |
| 5,696,176 A | 12/1997 | Khemani et al. |
| 6,395,823 B1 | 5/2002 | Brink et al. |
| 6,545,119 B2 | 4/2003 | Kizumoto et al. |
| 6,593,444 B2 | 7/2003 | Forschner et al. |
| 8,048,937 B2 | 11/2011 | Heischkel et al. |
| 8,524,834 B2 | 9/2013 | Marsh et al. |
| 8,865,790 B2 | 10/2014 | Koltisko et al. |

(Continued)

FOREIGN PATENT DOCUMENTS

| | | |
|---|---|---|
| CA | 725198 A | 1/1966 |
| CA | 887114 A | 11/1971 |

(Continued)

OTHER PUBLICATIONS

ASTMD-5296, 2011.

(Continued)

*Primary Examiner* — Rabon A Sergent
(74) *Attorney, Agent, or Firm* — Robert C. Morriss

(57) ABSTRACT

Thermoplastic polymer compositions having enhanced properties, as well as methods of making and using the same, are provided. Thermoplastic polymers according to some aspects of the present invention may be rigid, but may also be suitable for use in applications requiring a thermoplastic polymer resin. Thermoplastic polymers according to various aspects of the present invention may be useful in preparing shaped articles such as, for example, sheets, films, tubes, preforms, bottles, profiles, and other similar articles.

21 Claims, 2 Drawing Sheets

(56) References Cited

U.S. PATENT DOCUMENTS

| | | |
|---|---|---|
| 9,029,461 B2 | 5/2015 | Marsh et al. |
| 9,234,073 B2 | 1/2016 | Siegenthaler et al. |
| 2003/0153673 A1 | 8/2003 | Schwalm et al. |
| 2004/0097642 A1 | 5/2004 | Schwalm et al. |
| 2004/0260023 A1 | 12/2004 | Park et al. |
| 2010/0204388 A1 | 8/2010 | Marsh et al. |
| 2010/0204392 A1 | 8/2010 | Marsh et al. |
| 2013/0012664 A1 | 1/2013 | Xie et al. |
| 2013/0131222 A1 | 5/2013 | Gross |
| 2013/0296488 A1 | 11/2013 | Marsh et al. |
| 2014/0256902 A1 | 9/2014 | Brauer et al. |
| 2014/0262020 A1 | 9/2014 | Snively |
| 2014/0296406 A1 | 10/2014 | Marsh et al. |
| 2014/0296407 A1 | 10/2014 | Marsh et al. |
| 2014/0342624 A1 | 11/2014 | Dorr et al. |
| 2019/0048124 A1 | 2/2019 | Strand et al. |
| 2019/0071532 A1 | 3/2019 | Strand et al. |

FOREIGN PATENT DOCUMENTS

| | | |
|---|---|---|
| DE | 102014103599 A1 | 10/2014 |
| EP | 0066130 A1 | 12/1982 |
| EP | 2414426 B1 | 12/2014 |
| GB | 1012929 A | 12/1965 |
| GB | 1057454 A | 2/1967 |
| GB | 1118732 A | 7/1968 |
| GB | 1389700 A | 4/1975 |
| WO | WO 99/11710 A1 | 3/1999 |
| WO | WO 99/11711 A1 | 3/1999 |
| WO | WO 01/72867 A2 | 10/2001 |
| WO | WO 2011/063172 A2 | 5/2011 |
| WO | WO 2011/112923 A2 | 9/2011 |
| WO | WO 2013/172812 A1 | 11/2013 |

OTHER PUBLICATIONS

ASTMD-3418, 2015.
ASTM D-638, 2015.
ASTM D-2369, 2015.
ASTM D-4440, 2015.
Copending U.S. Appl. No. 16/077,550, filed Aug. 13, 2018, Strand et al.
Notification of Transmittal of The International Search Report and The Written Opinion of the International Searching Authority, or the Declaration; International Application No. PCT/US17/17866 dated Feb. 15, 2017.
Notification of Transmittal of The International Search Report and The Written Opinion of the International Searching Authority, or the Declaration; International Application No. PCT/US17/17864 dated Feb. 15, 2017.
Extended European Search Report; Application No. 17757006.6 dated Sep. 24, 2019.
Extended European Search Report; Application No. 17757007.4 dated Sep. 25, 2019.
Office Action dated Apr. 2, 2020 received in co-pending U.S. Appl. No. 16/077,550.

ISOCYANATE-MODIFIED RIGID THERMOPLASTIC POLYMER COMPOSITIONS

BACKGROUND

1. Field of the Invention

The present invention relates generally to thermoplastic polymers. In particular, this invention relates to thermoplastic polymer compositions having desirable properties, as well as methods of making and using the same.

2. Description of Related Art

Thermoplastic polymers are useful in a wide variety of applications, including, for example, various electrical, automotive, medical, consumer, industrial, and packaging applications. Thermoplastic polymers are advantaged over thermoset plastics in that thermoplastic polymers can be easily melt processed in to a variety of useful articles. Different types of thermoplastic polymers have different properties that make them desirable for certain end uses. Elastomeric thermoplastic polymers have glass transition temperature values below room temperature and low modulus values making them suitable for applications requiring flexibility and stretchability. In contrast, rigid thermoplastic polymers have glass transition temperature values above room temperature and high modulus values making them suitable for applications requiring stiffness and strength.

Thermoplastic polyesters are one class of thermoplastic polymers which are generally formed by polycondensation of a monomeric diacid and a monomeric diol. Thermoplastic polyesters can be either elastomeric or rigid, but the vast majority are rigid. Rigid thermoplastic polyesters exhibit desirable properties such as dimensional stability, chemical resistance, heat resistance, low creep, low haze, good color stability, and/or toughness, depending, at least in part, on the specific composition and morphology of the material. However, thermoplastic polyesters must be processed at high temperatures that can cause molecular weight degradation, which adversely effects the properties of the final material. Moreover, thermoplastic polyesters degrade significantly at temperatures above 300° C., and, as a result, the use of these materials in high temperature applications is very limited.

Thermoplastic polyurethanes (TPUs) are another type of thermoplastic polymer, which are formed by the reaction of isocyanates and diols. The vast majority of TPUs have glass transition temperature values well below room temperature and have low modulus values, and, as a result, most are elastomeric or, at best, partially rigid. As a result, traditional thermoplastic polyurethanes are not used in applications requiring polymers capable of exhibiting high stiffness and strength. It is possible to create a rigid thermoplastic polyurethane (RTPU) by incorporating very high levels of isocyanate residues into the TPU, but such polymers are expensive and are not widely used. Further, although these polymers have higher dry glass transition temperatures than other thermoplastic polyurethanes, RTPUs are highly susceptible to moisture uptake, which ultimately depresses glass transition temperature, thereby limiting the usefulness of these materials in humid applications.

Thus, a need exists for rigid thermoplastic polyester compositions that can be processed at temperatures much lower than 300° C. In particular, this could enable rigid thermoplastic polyester compositions that can be processed (e.g., molded) and that would be suitable for use in high temperature applications. Desirably, the polymer would be compatible with existing thermoplastic processes and equipment, and could be used in a many types of articles, and would exhibit similar, or better, properties than articles formed with conventional rigid thermoplastic polymers.

SUMMARY

One aspect of the present invention concerns a thermoplastic polymer. In embodiments of the invention, the thermoplastic polymer comprises residues of at least one linear polymeric polyester diol, wherein the linear polymeric polyester diol comprises residues of at least one monomeric diacid and at least one monomeric diol and the linear polymeric polyester diol has a number average molecular weight of at least 400 Daltons. In embodiments, the thermoplastic polymer further comprises residues of at least one diisocyanate monomer, and the residues of the diisocyanate monomer are present in the polymer in an amount of not more than 40 weight percent, based on the total weight of the polymer. In embodiments, the polymer has a tensile modulus of at least 1000 MPa or a glass transition temperature of at least 70° C. In some embodiments, the polymer has a glass transition temperature of at least 70° C. In some embodiments, the polymer has a tensile modulus of at least 1000 MPa. In embodiments, the polymer has a tensile modulus of at least 1000 MPa and a glass transition temperature of at least 70° C.

In certain embodiments, the linear polymeric polyester diol has a glass transition temperature of at least −5° C. In some embodiments, the linear polymeric polyester diol has a number average molecular weight in the range from 400 to 5000 Daltons, or from 450 to 3000 Daltons. In one embodiment, the monomeric diol is selected from the group consisting of 2,2,4,4-tetramethyl-1,3-cyclobutanediol, isosorbide, 1,4-cyclohexanedimethanol, 1,3-cyclohexanedimethanol, ethylene glycol, 2,2' ((sulfonylbis (4,1-phenylene))bis(oxy)diethanol, 2,6-decalinedimethanol, tricyclodecane dimethanol, 1,4 benzene dimethanol, 2,2'-(1, 4-phenylenebis (oxy))diethanol, 2,2'-(2,4,8,10-tetraoxaspiro (5,5)undecane-3,9-diyl)bis(2-methylpropan-1-ol), neopentyl glycol, and combinations thereof. In one embodiment, the monomeric diol is selected from the group consisting of 2,2,4,4-tetramethyl-1,3-cyclobutanediol, isosorbide, 1,4-cyclohexanedimethanol, ethylene glycol, 2,6-decalinedimethanol, 1,4 benzene dimethanol, neopentyl glycol, and combinations thereof.

In some embodiments, the linear polymeric polyester diol comprises residues of at least two monomeric diols. In one embodiment, the linear polymeric polyester diol comprises residues of at least two monomeric diols chosen from 2,2,4,4-tetramethyl-1,3-cyclobutanediol, 1,4-cyclohexanedimethanol, and ethylene glycol; or chosen from 2,2,4,4-tetramethyl-1,3-cyclobutanediol and at least one of 1,4-cyclohexanedimethanol or ethylene glycol.

In certain embodiments, the monomeric diacid is selected from the group consisting of terephthalic acid, dimethylterephthalic acid, 4,4-sulfonyldibenzoic acid, resorcinol-o, o'diacetic acid, dimethylsuccinate, dimethyl biphenyl 4,4'-dicarboxylate, 1,4 cyclohexanedicarboxylic acid, 4,4'-stilbenedicarboxylic acid, 4,4'-isopropylidenediphenoxy acetic acid, dimethyl isophthalate, dimethyl 2,6-naphthalenedicarboxylate, dimethyl decahydronaphthalene-2,6-dicarboxylate, succinic acid, furan dicarboxylic acid, dimethyl furan dicarboxylate, and combinations thereof; or is selected from the group consisting of terephthalic acid, dimethylterephthalic acid, and combinations thereof.

In embodiments of the invention, the monomeric diol is selected from the group consisting of 2,2,4,4-tetramethyl-1,3-cyclobutanediol, isosorbide, 1,4-cyclohexanedimethanol, ethylene glycol, 2,6-decalinedimethanol, 1,4 benzene dimethanol, and combinations thereof and/or the monomeric diacid is selected from the group consisting of terephthalic acid, dimethyl-terephthalic acid, 4,4-sulfonyldibenzoic acid, dimethyl biphenyl 4,4'-dicarboxylate, 1,4 cyclohexanedicarboxylic acid, 4,4'-stilbenedicarboxylic acid, dimethyl isophthalate, dimethyl 2,6-naphthalenedicarboxylate, dimethyl decahydronaphthalene-2,6-dicarboxylate, and combinations thereof.

In certain embodiments, the diisocyanate monomer comprises an aromatic diisocyanate monomer. In one embodiment, the diisocyanate monomer comprises 4,4'-methylene diphenyl diisocyanate.

In certain embodiments, the polymer further comprises at least 0.5 weight percent of residues of at least one supplemental monomeric diol, based on the total weight of the polymer. In some embodiments, polymer further comprises at least 0.5 weight percent of residues of at least one supplemental monomeric diol, based on the total weight of the polymer, wherein said supplemental monomeric diol is selected from the group consisting of 2,2,4,4-tetramethyl-1,3-cyclobutanediol, isosorbide, 1,4-cyclohexanedimethanol, 1,3-cyclohexanedimethanol, ethylene glycol, 2,6-decalinedimethanol, tricyclodecane dimethanol, 1,4 benzene dimethanol, neopentyl glycol, and combinations thereof.

In some embodiments, the polymer further comprises residues of at least one branching monomer and/or at least one multifunctional isocyanate, wherein the total amount of said residues of said branching monomer and said multifunctional isocyanate present in said polymer are not more than 1 weight percent, based on the total weight of the polymer.

In certain embodiments, the polymer has a number average molecular weight of at least 10,000 Daltons, or from 10,000 to 100,000 Daltons. In embodiments, the polymer has a tensile modulus of at least 1000 MPa and a glass transition temperature of at least 70° C. In embodiments, the difference between the lower process temperature ($T_p$) and the glass transition temperature ($T_g$) of the polymer is not more than 135° C., or not more than 110° C.

In one embodiment, the monomeric diacid comprises residues of terephthalic acid and the monomeric diol comprises residues of at least two monomeric diols selected from the group consisting of 2,2,4,4-tetramethyl-1,3-cyclobutanediol, isosorbide, 1,4-cyclohexanedimethanol, ethylene glycol, 2,6-decalinedimethanol, 1,4 benzene dimethanol, and combinations thereof, wherein the residues of at least one of said at least two monomeric diols is present in the polymer in an amount in the range of from 1 to 50 mole percent and wherein the residues of another of the at least two monomeric diols is present in the polymer in an amount in the range of from 50 to 99 mole percent, based on 100 mole percent for the diol component of said linear polymeric polyester diol; the diisocyanate monomer comprises 4,4'-methylene diphenyl diisocyanate; and the polymer further comprises up to 20 weight percent of residues of at least one supplemental monomeric diol, based on the total weight of the polymer, wherein the supplemental monomeric diol is selected from the group consisting of 2,2,4,4-tetramethyl-1,3-cyclobutanediol, isosorbide, 1,4-cyclohexanedimethanol, 1,3-cyclohexanedimethanol, ethylene glycol, 2,6-decalinedimethanol, tricyclodecane dimethanol, 1,4 benzene dimethanol, neopentyl glycol, and combinations thereof.

In one embodiment, the polymer further comprises residues of at least one supplemental monomeric diol in an amount from 0.5 to 20 weight percent, based on the total weight of the polymer. In one embodiment, the linear polymeric polyester diol has a number average molecular weight in the range of from 500 to 2000 Daltons and a glass transition temperature of at least 0° C., and the polymer comprises 0.5 to 15 weight percent of residues of at least one supplemental monomeric diol, based on the total weight of the polymer.

In one aspect, the invention is directed to a method for making a thermoplastic polymer comprising: combining at least one polymeric polyester diol, at least one monomeric diisocyanate, and, optionally, at least one supplemental monomeric diol in a reaction zone, optionally, in the presence of a catalyst; and reacting the combination in the reaction zone to form a thermoplastic polymer; wherein the thermoplastic polymer comprises: (a) residues of the at least one linear polymeric polyester diol, wherein said linear polymeric polyester diol comprises residues of: (i) at least one monomeric diacid; and (ii) at least one monomeric diol, wherein said linear polymeric polyester diol has a number average molecular weight of at least 400 Daltons; and (b) residues of the at least one diisocyanate monomer, wherein said residues of said diisocyanate monomer are present in the polymer in an amount of not more than 40 weight percent, based on the total weight of said polymer; and wherein the polymer has a glass transition temperature of at least 70° C. or has a tensile modulus of at least 1000 MPa. In some embodiments, the polymer has a glass transition temperature of at least 70° C. In some embodiments, the polymer has a tensile modulus of at least 1000 MPa. In some embodiments, the invention is directed to a method for making a thermoplastic polymer having a glass transition temperature of at least 70° C. and a tensile modulus of at least 1000 MPa.

BRIEF DESCRIPTION OF THE DRAWINGS

Various embodiments of the present invention are described in detail below with reference to the attached drawing Figures, wherein.

DETAILED DESCRIPTION

Figure 1:
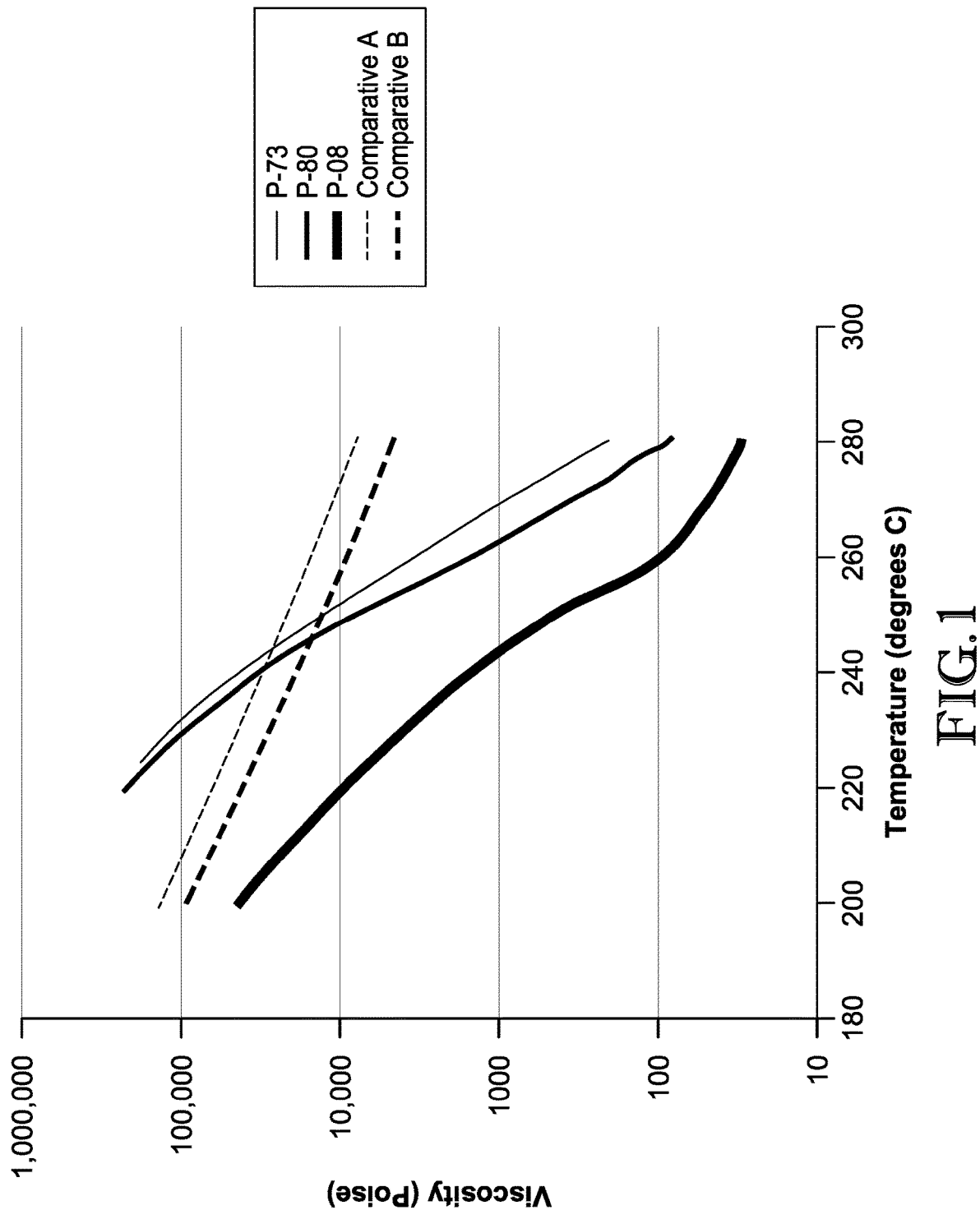
FIG. 1 is a graphical depiction of a temperature scan of several inventive and comparative polymers as described in Example 7.

Various embodiments of the present invention relate to an isocyanate-modified thermoplastic polymer composition, as well as methods of making and using the same. It has been discovered that addition of minor amounts of diisocyanate materials to certain thermoplastic polymer compositions may provide rigid polymers with glass transition temperatures and/or high modulus values that can be melt processed at temperatures significantly lower than 300° C. These rigid polymers, which differ from traditional thermoplastic polyesters, thermoplastic polyurethanes, and rigid thermoplastic polyurethanes, may be used in conventional applications to provide shaped articles including, but not limited to, sheets, films, tubes, preforms, bottles, profiles, and other similar articles, which exhibit similar, or superior, properties as compared to similar articles formed from conventional thermoplastic materials.

As used herein, the term "thermoplastic" is intended to have its plain meaning as understood by persons of ordinary skill in the art. In particular, a thermoplastic polymer is a polymer that softens when exposed to heat and that returns to its original conditions when cooled to room temperature. The terms "thermoset" or "thermosetting," as used herein, are also intended to have the plain meaning understood by persons of ordinary skill in the art. More specifically, thermosetting polymers or prepolymers are those which are irreversibly curable by application of heat, chemicals, and/or irradiated energy. As described in further detail below, polymers of the present invention may be thermoplastic and, therefore, exclude conventional thermoset or thermosetting materials. Additional details regarding the specific composition of the inventive polymers, as well as methods of making and using the same, will be discussed further below.

The thermoplastic polymers of the present invention comprise residues of at least one polymeric diol and at least one isocyanate. As used herein, the term "residue" refers to any organic structure incorporated into a polymeric material by a step growth, polycondensation, or ring opening reaction involving the corresponding monomer. It should also be understood that residues associated with various polymeric materials, including polymeric diols, may be derived from the parent monomer compound itself or any suitable derivative thereof. For example, a polyester diol comprising residues of a diacid may be derived from a dicarboxylic acid monomer or its associated acid halides, esters, half-esters, salts, half-salts, anhydrides, mixed anhydrides, or mixtures thereof. Thus, as used herein, the generic name of the parent monomer, such as, for example, "diacid," is intended to include the parent monomer itself as well as its derivatives, unless otherwise noted.

As used herein, the term "diol" refers to a compound having two reactive hydroxyl-functional groups. A diol formed from a single molecular unit is referred to as "monomeric diol," while the term "polymeric diol" is used to refer to a diol having two or more molecular units. Polymeric diols may be formed by, for example, reacting a hydroxyl-functional monomer with one or more other types of monomers. According to various embodiments of the present invention, at least about 45, at least about 50, at least about 55, at least about 60, at least about 65, at least about 70, at least about 75, or at least about 80 weight percent of the total residues of the thermoplastic polymer may be residues of one or more polymeric diols. Additionally, or in the alternative, not more than about 95, not more than about 92.5, or not more than about 90 weight percent of the total residues of the thermoplastic polymer may comprise residues of one or more polymeric diols. Examples of suitable polymeric diols can include, but are not limited to, polyester diols, polyether diols, polycaprolactone diols, polycarbonate diols, and combinations thereof.

In some embodiments, the thermoplastic polymer may include residues of one or more polymeric diols in an amount in the range of from 45 to 95 weight percent, 45 to 92.5 weight percent, about 45 to about 90 weight percent, from 50 to 95 weight percent, 50 to 92.5 weight percent, about 50 to about 90 weight percent, from about 55 to about 95 weight percent, about 55 to about 92.5 weight percent, about 55 to about 90 weight percent, from about 60 to about 95 weight percent, about 60 to about 92.5 weight percent, about 60 to about 90 weight percent, from about 65 to about 95 weight percent, about 65 to about 92.5 weight percent, about 65 to about 90 weight percent, from about 70 to about 95 weight percent, about 70 to about 92.5 weight percent, from about 70 to about 90 weight percent, from about 75 to about 95 weight percent, about 75 to about 92.5 weight percent, about 75 to about 90 weight percent, from about 80 to about 95 weight percent, about 80 to about 92.5 weight percent, or about 80 to about 90 weight percent, based on the total weight of the polymer.

In some embodiments, the polymeric diol used to form the thermoplastic polymers of the present invention may include at least one linear polymeric polyester diol. As used herein, the term "linear diol," when used in reference to a polymeric diol, refers to a polymeric diol having a theoretical hydroxyl functionality of less than 2.2. In some embodiments, the linear polyester polymeric diols suitable for use in the thermoplastic polymers described herein may have a theoretical hydroxyl functionality of not more than 2.15, not more than 2.10, not more than 2.05, or not more than 2.01.

In contrast with conventional thermosetting or otherwise crosslinkable polymer materials, the isocyanate-modified thermoplastic polymer materials described herein may include less than about 5, less than about 3, less than about 2, less than about 1, less than about 0.5, or less than about 0.1 weight percent of residues of one or more nonlinear polymeric polyester multifunctional alcohols having a hydroxyl functionality of 2.2 or greater, based on the total weight of the polymer. In addition to a polymeric polyester diol, in some embodiments, the thermoplastic polymer may include not more than about 10, not more than about 7, not more than about 5, not more than about 3, not more than about 2, not more than about 1, or not more than about 0.5 weight percent of one or more linear polymeric diols other than a linear polymeric polyester diol, based on the total weight of the polymer.

In embodiments, the polymeric polyester diols used to form the isocyanate-modified thermoplastic polymers described herein comprise an acid component, a diol component, and, optionally, a multifunctional alcohol component.

The polymeric polyester diols used in the present invention typically can be prepared from dicarboxylic acids and diols which react in substantially equal proportions and are incorporated into the polyester diol as their corresponding residues. The polyester diols of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues (or total moles of acid component), the total moles of diol residues (or total moles of diol component), or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % 2,2,4,4-tetramethyl-1,3-cyclobutanediol, based on the total diol residues, means the polyester contains 30 mole % 2,2,4,4-tetramethyl-1,3-cyclobutanediol residues out of a total of 100 mole % diol residues. Thus, there are 30 moles of 2,2,4,4-tetramethyl-1,3-cyclobutanediol residues among every 100 moles of diol residue.

The acid component of the polymeric polyester diol may comprise residues of one or more monomeric diacids. As used herein, the term "diacid" refers to a compound that includes two reactive carboxyl functional groups, and the term "monomeric diacid" refers to a diacid having a single molecular unit. In some embodiments, at least about 95, at least about 97, at least about 99, or at least about 99.5 mole percent of the total acid component of the polymeric polyester diol may include residues of one or more monomeric diacids. Optionally, in some embodiments, the acid component of the polymeric polyester diol may include residues of at least one monomeric multifunctional acid having more than two reactive carboxyl functional groups. However, if used, residues of monomeric multifunctional acids are generally present in an amount of less than about 5, less than about 3, less than about 1, or less than about 0.5 mole percent, based on the total moles of the acid component. In some embodiments, the acid component of the polymeric polyester diol includes no residues of monomeric multifunctional acids.

In some embodiments, the acid component can include two or more different monomeric diacid residues. When residues of two or more monomeric diacids are present, the diacids may be of the same type (e.g., two different aromatic diacids) or of different types (e.g., an aromatic diacid and an aliphatic diacid), and the residues of each of the different diacids may be present in similar or different amounts, based on the total moles of the acid component.

In embodiments where the acid component includes at least a first monomeric diacid and a second monomeric diacid, the residues of at least one of the first and second monomeric diacids may be present in an amount of at least about 1, at least about 5, at least about 10, at least about 20, or at least about 25 mole percent and/or not more than about 50, not more than about 40, not more than about 35 mole percent, based on the total moles of the acid component, while the other of the first and second monomeric diacids may be present in an amount of at least about 50, at least about 60, or at least about 65 mole percent, and/or not more than about 99, not more than about 95, not more than about 90, not more than about 80, or not more than about 75 mole percent, based on the total moles of the acid component. In other embodiments, the residues of each of the first and the second monomeric diacids may be present in an amount of at least about 40 or at least about 45 mole percent, and/or not more than about 60, not more than about 55, or not more than about 50 mole percent, based on the total moles of the acid component. In other embodiments, the acid component may include residues of at least three, or four or more different monomeric diacids.

In some embodiments, the residues of at least one of the first and second monomeric diacids may be present in an amount in the range of from about 1 to about 50, about 1 to about 40 mole percent, about 1 to about 35 mole percent, about 5 to about 50 mole percent, about 5 to about 40 mole percent, about 5 to about 35 mole percent, about 10 to about 50 mole percent, about 10 to about 40 mole percent, about 10 to about 35 mole percent, about 20 to about 50 mole percent, about 20 to about 40 mole percent, about 20 to about 35 mole percent, about 25 to about 50 mole percent, about 25 to about 40 mole percent, or about 25 to about 35 mole percent, based on the total moles of the acid component. The other of the first and second monomeric diacids may be present in an amount in the range of from about 50 to about 99 mole percent, about 50 to about 95 mole percent, about 50 to about 90 mole percent, about 50 to about 80 mole percent, about 50 to about 75 mole percent, about 60 to about 99 mole percent, about 60 to about 95 mole percent, about 60 to about 90 mole percent, about 60 to about 80 mole percent, about 60 to about 75 mole percent, about 65 to about 99 mole percent, about 65 to about 95 mole percent, about 65 to about 90 mole percent, about 65 to about 80 mole percent, or about 65 to about 75 mole percent, based on the total moles of the acid component.

In some embodiments, the residues of each of the first and the second monomeric diacids are present in the acid component in an amount in the range of from about 40 to about 60 mole percent, about 40 to about 55 mole percent, about 40 to about 50 mole percent, about 45 to about 60 mole percent, about 45 to about 55 mole percent, or about 45 to about 50 mole percent, based on the total moles of the acid component.

Any suitable type of monomeric diacid may be used to form the polymeric polyester diol described herein. Aromatic diacids, aliphatic diacids, acyclic diacids, alicyclic diacids, and combinations thereof may be employed. Examples of suitable monomeric diacids can include, but are not limited to, terephthalic acid, dimethyl-terephthalic acid, 4,4-sulfonyldibenzoic acid, resorcinol-o,o'diacetic acid, dimethylsuccinate, dimethyl biphenyl 4,4'-dicarboxylate, 1,4 cyclohexanedicarboxylic acid, 4,4'-stilbenedicarboxylic acid, 4,4'-isopropylidenediphenoxy acetic acid, isophthalic acid, dimethyl isophthalate, dimethyl 2,6-naphthalenedicarboxylate, dimethyl decahydronaphthalene-2,6-dicarboxylate, succinic acid, adipic acid, furan dicarboxylic acid, dimethyl furan dicarboxylate, and combinations thereof. In some embodiments, the polymeric polyester diol can include residues of at least one monomeric diacid selected from the group consisting of terephthalic acid, dimethyl-terephthalic acid, 4,4-sulfonyldibenzoic acid, dimethyl biphenyl 4,4'-dicarboxylate, 1,4 cyclohexanedicarboxylic acid, 4,4'-stilbenedicarboxylic acid, dimethyl isophthalate, dimethyl 2,6-naphthalenedicarboxylate, dimethyl decahydronaphthalene-2,6-dicarboxylate, adipic acid, furan dicarboxylic acid, dimethyl furan dicarboxylate, and combinations thereof. As discussed above, the term "diacid" encompasses the associated acid halides, esters, half-esters, salts, half-salts, anhydrides, or mixed anhydrides of the above-listed components.

The polymeric polyester diol also includes a diol component comprising residues of one or more monomeric diols. As discussed previously, the term "diol" refers to a compound having two reactive hydroxyl-functional groups, and the term "monomeric diol" refers to a diol formed from a single molecular unit. In some embodiments, at least about 95, at least about 97, at least about 99, or at least about 99.5 mole percent of the diol component may include residues of one or more monomeric diols. Optionally, in some embodiments, the diol component of the polymeric polyester diol may include residues of at least one monomeric multifunctional alcohol having more than two reactive hydroxyl functional groups. However, if used, the residues of monomeric multifunctional alcohols are generally present in an amount of less than about 5, less than about 3, less than about 1, or less than about 0.5 mole percent, based on the total moles of the diol component.

In some embodiments, the diol component of the polymeric polyester diol can include residues of two or more different monomeric diols. When residues of two or more monomeric diols are present, the monomeric diols may be of the same type (e.g., two different aromatic diols) or of different types (e.g., an aromatic diol and an aliphatic diol), and the residues of each of the different monomeric diols may be present in similar or different amounts, based on the total moles of the diol component.

When the diol component includes residues of at least a first monomeric diol and a second monomeric diol, the residues of at least one of the first and second monomeric diols may be present in an amount of at least about 1, at least about 5, at least about 10, at least about 20, at least about 25 mole percent, or at least about 30 mole percent and/or not more than about 50, not more than about 40, not more than about 35 mole percent, based on the total moles of the diol component, while the other of the residues of the first and second monomeric diols may be present in an amount of at least about 50, at least about 60, at least about 70 mole percent and/or not more than about 99, not more than about 95, not more than about 90, not more than about 80, or not more than about 75 mole percent, based on the total moles of the diol component. In other embodiments, the residues of each of the first and the second monomeric diols may be present in an amount of at least about 40 or at least about 45 mole percent and/or not more than about 60, not more than about 55, or not more than about 50 mole percent, based on the total moles of the diol component. In other embodiments, the diol component may include residues of at least three, or four or more different monomeric diols.

In some embodiments, the residues of at least one of the first and second monomeric diols may be present in an amount in the range of from about 1 to about 50, about 1 to about 40 mole percent, about 1 to about 35 mole percent, about 5 to about 50 mole percent, about 5 to about 40 mole percent, about 5 to about 35 mole percent, about 10 to about 50 mole percent, about 10 to about 40 mole percent, about 10 to about 35 mole percent, about 20 to about 50 mole percent, about 20 to about 40 mole percent, about 20 to about 35 mole percent, about 25 to about 50 mole percent, about 25 to about 40 mole percent, or about 25 to about 35 mole percent, based on the total moles of the diol component. The other of the first and second monomeric diols may be present in an amount in the range of from about 50 to about 99 mole percent, about 50 to about 95 mole percent, about 50 to about 90 mole percent, about 50 to about 80 mole percent, about 50 to about 75 mole percent, about 60 to about 99 mole percent, about 60 to about 95 mole percent, about 60 to about 90 mole percent, about 60 to about 80 mole percent, about 60 to about 75 mole percent, about 65 to about 99 mole percent, about 65 to about 95 mole percent, about 65 to about 90 mole percent, about 65 to about 80 mole percent, or about 65 to about 75 mole percent, based on the total moles of the diol component.

In some embodiments, the residues of each of the first and the second monomeric diols are present in the diol component in an amount in the range of from about 40 to about 60 mole percent, about 40 to about 55 mole percent, about 40 to about 50 mole percent, about 45 to about 60 mole percent, about 45 to about 55 mole percent, or about 45 to about 50 mole percent, based on the total moles of the diol component.

Any suitable type of monomeric diol may be used to form the polymeric polyester diol described herein. Aromatic diols, aliphatic diols, acyclic diols, alicyclic diols, and combinations thereof may be employed. Examples of suitable monomeric diols can include, but are not limited to, 2,2,4,4-tetramethyl-1,3-cyclobutanediol, isosorbide, 1,4-cyclohexanedimethanol, 1,3-cyclohexanedimethanol, ethylene glycol, 2,2'-((sulfonylbis(4,1-phenylene))bis(oxy)diethanol, 2,6-decalinedimethanol, tricyclodecane dimethanol, 1,4 benzene dimethanol, 2,2'-(1,4-phenylenebis (oxy))diethanol, 2,2'-(2,4,8,10-tetraoxaspiro(5,5)undecane-3,9-diyl)bis (2-methylpropan-1-ol), neopentyl glycol, and combinations thereof. In some embodiments, the polymeric polyester diol may include residues of at least one diol selected from the group consisting of 2,2,4,4-tetramethyl-1,3-cyclobutanediol, isosorbide, 1,4-cyclohexanedimethanol, ethylene glycol, 2,6-decalinedimethanol, 1,4-benzene dimethanol, and combinations thereof. In one embodiment, the monomeric diols used to form the polymeric polyester diol described herein comprise 2,2,4,4-tetramethyl-1,3-cyclobutanediol and 1,4-cyclohexanedimethanol.

In embodiments, the polymeric polyester diol comprises 2,2,4,4-tetramethyl-1,3-cyclobutanediol in an amount from 50 to 80 mole percent and 1,4-cyclohexanedimethanol in an amount from 20 to 50 mole percent; or 2,2,4,4-tetramethyl-1,3-cyclobutanediol in an amount from 60 to 80 mole percent and 1,4-cyclohexanedimethanol in an amount from 20 to 40 mole percent; or 2,2,4,4-tetramethyl-1,3-cyclobutanediol in an amount from 65 to 75 mole percent and 1,4-cyclohexanedimethanol in an amount from 25 to 35 mole percent; or 2,2,4,4-tetramethyl-1,3-cyclobutanediol in an amount of about 70 mole percent and 1,4-cyclohexanedimethanol in an amount of about mole percent; all based on the total moles of the diol component. In some embodiments, the 2,2,4,4-tetramethyl-1,3-cyclobutanediol and 1,4-cyclohexanedimethanol with less than 5, or less than 4, or less than 3, or less than 2, or less than 1 mole percent of any other monomeric diols, based on the total moles of the diol component. In one embodiment, this is no other intentionally added monomeric diol to the polymeric polyester diol. In one embodiment, where the diol component is based on 2,2,4,4-tetramethyl-1,3-cyclobutanediol and 1,4-cyclohexanedimethanol, the diacid component comprises at least 95 mole percent, or 100 mole percent, of terephthalic acid or a derivative, based on the total moles of the diacid component.

The polymeric polyester diol used to form thermoplastic polymers of the present invention may have a molecular weight of at least 400 Daltons. As used herein, the terms "molecular weight" and "number average molecular weight" refers to the number average molecular weight measured by gel permeation chromatography (GPC) according to ASTM method D-5296 using HFIP/methylene chloride as a solvent in an Agilent 1100 Series GPC-SEC system with a refractive index detector calibrated to polystyrene standards. In some embodiments, the number average molecular weight of the polymeric polyester diol can be at least about 450, at least about 500 Daltons, or at least about 600 Daltons and/or not more than about 5000, not more than about 4000, not more than about 3000, not more than about 2500, not more than about 2000, not more than about 1800 Daltons, or not more than about 1200 Daltons.

The polymeric polyester diol may have a number average molecular weight in the range of from about 400 to about 5000 Daltons, about 400 to about 4000 Daltons, about 400 to about 3000 Daltons, about 400 to about 2500 Daltons, about 400 to about 2000 Daltons, about 400 to about 1800 Daltons, about 400 to about 1200 Daltons, about 450 to about 5000 Daltons, about 450 to about 4000 Daltons, about 450 to about 3000 Daltons, about 450 to about 2500 Daltons, about 450 to about 2000 Daltons, about 450 to about 1800 Daltons, about 450 to about 1200 Daltons, about 500 to about 5000 Daltons, about 500 to about 4000 Daltons, about 500 to about 3000 Daltons, about 500 to about 2500 Daltons, about 500 to about 2000 Daltons, about 500 to about 1800 Daltons, about 500 to about 1200 Daltons, about 600 to about 5000 Daltons, about 600 to about 4000 Daltons, about 600 to about 3000 Daltons, about 600 to about 2500 Daltons, about 600 to about 2000 Daltons, about 600 to about 1800 Daltons, or about 600 to about 1200 Daltons, measured as described above.

In some embodiments, the polymeric polyester diols having molecular weights in one or more of the above ranges may also have a glass transition temperature greater than about −5° C., measured using a Q2000 differential scanning calorimeter (DSC) available from TA Instruments according to ASTM method D-3418 at a scanning rate of 20° C./min. The polymeric polyester diol can have a glass transition temperature of at least about 0, at least about 5, at least about 10, at least about 15, at least about 20, at least about 25, at least about 30, at least about 35, at least about 40, at least about 45, at least about 50, at least about 55° C. and/or not more than about 150, not more than about 145, not more than about 140, not more than about 135, not more than about 130, not more than about 125, not more than about 120, not more than about 115, not more than about 110, not more than about 105, not more than about 100, not more than about 95, not more than about 90, not more than about 85, not more than about not more than about 80, not more than about 75, not more than about 70, not more than about 65, not more than about 60, or not more than about 55, not more than about 50, not more than about 45, not more than about 40, not more than about 35, not more than about 30, or not more than about 25° C.

The glass transition temperature of the polymeric polyester diol can be in the range of from about −5 to about 150° C., about −5 to about 145° C., about −5 to about 140° C., about −5 to about 135° C., about −5 to about 130° C., about −5 to about 125° C., about −5 to about 120° C., about −5 to about 115° C., about −5 to about 110° C., about −5 to about 105° C., about −5 to about 100° C., about −5 to about 95° C., about −5 to about 90° C., about −5 to about 85° C., about −5 to about 80° C., about −5 to about 75° C., about −5 to about 70° C., about −5 to about 65° C., about −5 to about 60° C., about −5 to about 55° C., about −5 to about 50° C., about −5 to about 45° C., about −5 to about 40° C., about −5 to about 35° C., about −5 to about 30° C., about −5 to about 25° C., about 0 to about 150° C., about 0 to about 145° C., about 0 to about 140° C., about 0 to about 135° C., about 0 to about 130° C., about 0 to about 125° C., about 0 to about 120° C., about 0 to about 115° C., about 0 to about 110° C., about 0 to about 105° C., about 0 to about 100° C., about 0 to about 95° C., about 0 to about 90° C., about 0 to about 85° C., about 0 to about 80° C., about 0 to about 75° C., about 0 to about 70° C., about 0 to about 65° C., about 0 to about 60° C., about 0 to about 55° C., about 0 to about 50° C., about 0 to about 45° C., about 0 to about 40° C., about 0 to about 35° C., about 0 to about 30° C., about 0 to about 25° C., about 5 to about 150° C., about 5 to about 145° C., about 5 to about 140° C., about 5 to about 135° C., about 5 to about 130° C., about 5 to about 125° C., about 5 to about 120° C., about 5 to about 115° C., about 5 to about 110° C., about 5 to about 105° C., about 5 to about 100° C., about 5 to about 95° C., about 5 to about 90° C., about 5 to about 85° C., about 5 to about 80° C., about 5 to about 75° C., about 5 to about 70° C., about 5 to about 65° C., about 5 to about 60° C., about 5 to about 55° C., about 5 to about 50° C., about 5 to about 45° C., about 5 to about 40° C., about 5 to about 35° C., about 5 to about 30° C., about 5 to about 25° C., about 10 to about 150° C., about 10 to about 145° C., about 10 to about 140° C., about 10 to about 135° C., about 10 to about 130° C., about 10 to about 125° C., about 10 to about 120° C., about 10 to about 115° C., about 10 to about 110° C., about 10 to about 105° C., about 10 to about 100° C., about 10 to about 95° C., about 10 to about 90° C., about 10 to about 85° C., about 10 to about 80° C., about 10 to about 75° C., about 10 to about 70° C., about 10 to about 65° C., about 10 to about 60° C., about 10 to about 55° C., about 10 to about 50° C., about 10 to about 45° C., about 10 to about 40° C., about 10 to about 35° C., about 10 to about 30° C., about 10 to about 25° C., about 15 to about 150° C., about 15 to about 145° C., about 15 to about 140° C., about 15 to about 135° C., about 15 to about 130° C., about 15 to about 125° C., about 15 to about 120° C., about 15 to about 115° C., about 15 to about 110° C., about 15 to about 105° C., about 15 to about 100° C., about 15 to about 95° C., about 15 to about 90° C., about 15 to about 85° C., about 15 to about 80° C., about 15 to about 75° C., about 15 to about 70° C., about 15 to about 65° C., about 15 to about 60° C., about 15 to about 55° C., about 15 to about 50° C., about 15 to about 45° C., about 15 to about 40° C., about 15 to about 35° C., about 15 to about 30° C., about 15 to about 25° C., about 20 to about 150° C., about 20 to about 145° C., about 20 to about 140° C., about 20 to about 135° C., about 20 to about 130° C., about 20 to about 125° C., about 20 to about 120° C., about 20 to about 115° C., about 20 to about 110° C., about 20 to about 105° C., about 20 to about 100° C., about 20 to about 95° C., about 20 to about 90° C., about 20 to about 85° C., about 20 to about 80° C., about 20 to about 75° C., about 20 to about 70° C., about 20 to about 65° C., about 20 to about 60° C., about 20 to about 55° C., about 20 to about 50° C., about 20 to about 45° C., about 20 to about 40° C., about 20 to about 35° C., about 20 to about 30° C., about 20 to about 25° C., about 25 to about 150° C., about 25 to about 145° C., about 25 to about 140° C., about 25 to about 135° C., about 25 to about 130° C., about 25 to about 125° C., about 25 to about 120° C., about 25 to about 115° C., about 25 to about 110° C., about 25 to about 105° C., about 25 to about 100° C., about 25 to about 95° C., about 25 to about 90° C., about 25 to about 85° C., about 25 to about 80° C., about 25 to about 75° C., about 25 to about 70° C., about 25 to about 65° C., about 25 to about 60° C., about 25 to about 55° C., about 25 to about 50° C., about 25 to about 45° C., about 25 to about 40° C., about 25 to about 35° C., about 25 to about 30° C., about 30 to about 150° C., about 30 to about 145° C., about 30 to about 140° C., about 30 to about 135° C., about 30 to about 130° C., about 30 to about 125° C., about 30 to about 120° C., about 30 to about 115° C., about 30 to about 110° C., about 30 to about 105° C., about 30 to about 100° C., about 30 to about 95° C., about 30 to about 90° C., about 30 to about 85° C., about 30 to about 80° C., about 30 to about 75° C., about 30 to about 70° C., about 30 to about 65° C., about 30 to about 60° C., about 30 to about 55° C., about 30 to about 50° C., about 30 to about 45° C., about 30 to about 40° C., about 30 to about 35° C., about 35 to about 150° C., about 35 to about 145° C., about 35 to about 140° C., about 35 to about 135° C., about 35 to about 130° C., about 35 to about 125° C., about 35 to about 120° C., about 35 to about 115° C., about 35 to about 110° C., about 35 to about 105° C., about 35 to about 100° C., about 35 to about 95° C., about 35 to about 90° C., about 35 to about 85° C., about 35 to about 80° C., about 35 to about 75° C., about 35 to about 70° C., about 35 to about 65° C., about 35 to about 60° C., about 35 to about 55° C., about 35 to about 50° C., about 35 to about 45° C., about 35 to about 40° C., about 40 to about 150° C., about 40 to about 145° C., about 40 to about 140° C., about 40 to about 135° C., about 40 to about 130° C., about 40 to about 125° C., about 40 to about 120° C., about 40 to about 115° C., about 40 to about 110° C., about 40 to about 105° C., about 40 to about 100° C., about 40 to about 95° C., about 40 to about 90° C., about 40 to about 85° C., about 40 to about 80° C., about 40 to about 75° C., about 40 to about 70° C., about 40 to about 65° C., about 40 to about 60° C., about 40 to about 55° C., about 40 to about 50° C., about 40 to about 45° C., about 45 to about 150° C., about 45 to about 145° C., about 45 to about 140° C., about 45 to about 135° C., about 45 to about 130° C., about 45 to about 125° C., about 45 to about 120° C., about 45 to about 115° C., about 45 to about 110° C., about 45 to about 105° C., about 45 to about 100° C., about 45 to about 95° C., about 45 to about 90° C., about 45 to about 85° C., about 45 to about 80° C., about 45 to about 75° C., about 45 to about 70° C., about 45 to about 65° C., about 45 to about 60° C., about 45 to about 55° C., about 45 to about 50° C., about 50 to about 150° C., about 50 to about 145° C., about 50 to about 140° C., about 50 to about 135° C., about 50 to about 130° C., about 50 to about 125° C., about 50 to about 120° C., about 50 to about 115° C., about 50 to about 110° C., about 50 to about 105° C., about 50 to about 100° C., about 50 to about 95° C., about 50 to about 90° C., about 50 to about 85° C., about 50 to about 80° C., about 50 to about 75° C., about 50 to about 70° C., about 50 to about 65° C., about 50 to about 60° C., about 50 to about 55° C., about 55 to about 150° C., about 55 to about 145° C., about 55 to about 140° C., about 55 to about 135° C., about 55 to about 130° C., about 55 to about 125° C., about 55 to about 120° C., about 55 to about 115° C., about 55 to about 110° C., about 55 to about 105° C., about 55 to about 100° C., about 55 to about 95° C., about 55 to about 90° C., about 55 to about 85° C., about 55 to about 80° C., about 55 to about 75° C., about 55 to about 70° C., about 55 to about 65° C., or about 55 to about 60° C.

In some embodiments, the thermoplastic polymer described herein may include residues of two or more different polymeric polyester diols. For example, in some embodiments, the thermoplastic polymer may include at least a first polymeric polyester diol and a second polymeric polyester diol. It is preferred that the first and second polymeric polyester diols do not transesterify with one another, so that the thermoplastic polymer includes at least 0.5 weight percent of residues each of the first and second polymeric polyester diols. In some embodiments, the weight ratio of the first and second polyester diols can be from 90:10 to 10:90, 80:20 to 20:80, 70:30 to 30:70, or 60:40 to 40:60. In some embodiments, the residues of each of the first and second polymeric polyester diols may be present in the thermoplastic polymer in an amount of at least about 1, at least about 5, at least about 10, at least about 15, at least about 20, at least about 25, at least about 35, at least about 40, or at least about 45 weight percent, based on the total weight of the thermoplastic polymer and/or not more than about 50, not more than about 40, not more than about 35 weight percent, based on the total weight of the thermoplastic polymer. The residues of each of the first and second polymeric polyester diols may be present in the thermoplastic polymer in similar amounts, or the residues of one of the polymeric polyester diols may be present in a greater amount than the residues of the other.

When the thermoplastic polymer includes residues of at least a first and a second polymeric polyester diol, in some embodiments, the residues of each of the first and second polymeric polyester diols may be present in the thermoplastic polymer in an amount in the range of from about 1 to about 50, about 1 to about 40 weight percent, about 1 to about 35 weight percent, about 5 to about 50 weight percent, about 5 to about 40 weight percent, about 5 to about 35 weight percent, about 10 to about 50 weight percent, about 10 to about 40 weight percent, about 10 to about 35 weight percent, about 15 to about 50 weight percent, about 15 to about 40 weight percent, about 15 to about 35 weight percent, about 20 to about 50 weight percent, about 20 to about 40 weight percent, about 20 to about 35 weight percent, about 25 to about 50 weight percent, about 25 to about 40 weight percent, about 25 to about 35 weight percent, or about 30 to 35 weight percent.

The polymeric polyester diols used to form thermoplastic polymer materials as described herein can be formed according to any suitable method. For example, in some embodiments, the diacid and diol starting materials may be combined and heated under conditions sufficient to form the desired polymeric polyester diol. Byproducts, such as water (if acids are used as starting materials) or alcohol (if esters are used as starting materials) may be collected and removed from the reaction zone in order to promote synthesis of the polymeric polyester diol. The reaction temperature can be in the range of from about 150 to about 250° C., and the reaction pressure may be at or below atmospheric. The reaction may proceed for an amount of time sufficient to achieve a glass transition temperature and molecular weight for the polymeric polyester diol within one or more of the above ranges. The initial molar ratio of diacid starting materials to diol starting materials can be approximately 1:1, with a slight excess of diol possible and, if desired, the reaction may take place in the presence of a catalyst, such as, for example, a tin-based catalyst, and, optionally, an organic solvent. The amount of catalyst may, in some embodiments, be present in an amount in the range of from 0.1 to 1 weight percent, based on the total weight of the reaction mixture. Any suitable method of recovering the resulting polymeric polyester diol from the reaction mixture may employed.

As mentioned previously, the thermoplastic polymer of the present invention may also include residues of at least one isocyanate. The term "isocyanate," as used herein, refers to a component including at least one reactive isocyanate group. In contrast to other polymeric systems that utilize one or more isocyanate components as cross-linkers, the thermoplastic polymer described herein includes residues of at least one isocyanate in its polymeric backbone. According to embodiments of the present invention, the total amount of isocyanate residues present in the thermoplastic polymer can be not more than about 40, not more than about 35, not more than about 30, not more than about 25, or not more than about 20 weight percent, based on the total weight of the polymer. Additionally, in embodiments, the total amount of isocyanate residues present in the thermoplastic polymer can be at least about 5, at least about 7.5, at least about 10, or at least about 12, based on the total weight of the polymer.

In some embodiments, the total amount of isocyanate residues in the thermoplastic polymer can be in the range of from about 5 to about 40 weight percent, about 5 to about 35 weight percent, about 5 to about 30 weight percent, about 5 to about 25 weight percent, about 5 to about 20 weight percent, about 7.5 to about 40 weight percent, about 7.5 to about 35 weight percent, about 7.5 to about 30 weight percent, about 7.5 to about 25 weight percent, about 7.5 to about 20 weight percent, about 10 to about 40 weight percent, about 10 to about 35 weight percent, about 10 to about 30 weight percent, about 10 to about 25 weight percent, about 10 to about 20 weight percent, about 12 to about 40 weight percent, about 12 to about 35 weight percent, about 12 to about 30 weight percent, about 12 to about 25 weight percent, or about 12 to about 20 weight percent, based on the total weight of the polymer. In some embodiments, the total amount of isocyanate residues can be in the range of from about 20 to about 40 weight percent, about 20 to about 35 weight percent, about 20 to about 30 weight percent, about 25 to about 40 weight percent, about 25 to about 35 weight percent, about 25 to about 30 weight percent, about 27 to about 40 weight percent, about 27 to about 35, or about 27 to about 30 weight percent, based on the total weight of the polymer.

Suitable isocyanates can include diisocyanates, polyisocyanates, or combinations thereof. As used herein, the term "diisocyanate" refers to a compound including two reactive isocyanate groups, while the terms "polyisocyanate" and "multifunctional isocyanate" refer to isocyanates having three or more reactive isocyanate groups. When present, the total amount of polyisocyanate residues may be less than about 5, less than about 3, less than about 1, or less than about 0.5 weight percent, based on the total weight of isocyanate residues.

Any suitable monomeric diisocyanate may be used to form the thermoplastic polymer materials described herein. The monomeric diisocyanates may comprise aromatic diisocyanates, aliphatic diisocyanates, and combinations thereof.

For example, in some embodiments, the thermoplastic polymer may include at least about 50, at least about 55, at least about 60, at least about 65, at least about 70, at least about 75, at least about 80, at least about 85, at least about 90, at least about 95, or at least about 97 weight percent of residues of one or more aromatic diisocyanate monomers, based on the total weight of the isocyanate residues. In some cases, the thermoplastic polymer as described herein may include residues of at least one aliphatic isocyanate monomer and, when present, the monomeric aliphatic isocyanate residues may be present in an amount of at least about 5, at least about 10, at least about 15, at least about 20 weight percent and/or not more than about 70, not more than about 60, not more than about 50 weight percent, based on the total amount of isocyanate residues, or the total amount of monomeric aliphatic isocyanate residues can be in the range of from about 5 to about 70 weight percent, about 5 to about 60 weight percent, about 5 to about 50 weight percent, about 10 to about 70 weight percent, about 10 to about 60 weight percent, about 10 to about 50 weight percent, about 15 to about 70 weight percent, about 15 to about 60 weight percent, about 15 to about 50 weight percent, about 20 to about 70 weight percent, about 20 to about 60 weight percent, or about 20 to about 50 weight percent, based on the total amount of isocyanate residues. In some embodiments, the ratio of the total amount of aromatic isocyanate residues to the total amount of aliphatic isocyanate residues present in the thermoplastic polymer can be greater than 1.5:1, greater than 2:1, greater than 2.5:1, or greater than 3:1, on a molar basis.

Examples of suitable isocyanates can include, but are not limited to, hexamethylene diisocyanate, isophorone diisocyanate, methylene dicyclohexyl diisocyanate, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, 2,2'-methylene diphenyl diisocyanate, 4,4'-methylene diphenyl diisocyanate, xylene diisocyanate, meta-tetramethylxylylene diisocyanate, hydrogenated xylene diisocyanate, naphthalene 1,5-diisocyanate, phenylene diisocyanate, 3,3'-dimethyldiphenyl-4,4'-diisocyanate, 1,6 hexamethylene diisocyanate, 2,2,4-trimethylhexamethylene diisocyanate, isophorone diisocyanate, 4,4'-dicyclohexylmethane diisocyanate, norbornane diisocyanate, 4,4'-dibenzyl diisocyanate, and combinations thereof. In some embodiments, the isocyanate may be selected from the group consisting of 2,2'-methylene diphenyl diisocyanate and 4,4'-methylene diphenyl diisocyanate, while in other embodiments, the isocyanate may be 4,4'-methylene diphenyl diisocyanate.

In addition to residues of at least one polymeric polyester diol and at least one isocyanate, the thermoplastic polymer described herein may include various amounts of residues of one or more additional components. Such additional components can include, but are not limited to, at least one supplemental monomeric diol, at least one branching monomer, or combinations thereof. As used herein, the term "supplemental monomeric diol" refers to a diol other than (or in addition to) the diol present in the polymeric polyester diol used to form the thermoplastic polymer of the present invention. For clarity, in embodiments, the supplemental monomeric diol can be the same type (i.e., same chemical species or compound) as a monomeric diol used to prepare the polymeric polyester diol. In other embodiments, the supplemental monomeric diol can be a different type (i.e., different chemical species or compound) than any of the monomeric diols used to prepare the polymeric polyester diol. By supplemental is meant that the monomeric diol is present in the thermoplastic polymer in addition to the polymeric polyester diol. In some embodiments, the thermoplastic polymer described herein may include at least about 0.5, at least about 1, at least about 2, at least about 3, at least about 5, at least about 8, or at least about 10 weight percent and/or not more than about 20, not more than about 18, not more than about 15, or not more than about 12 weight percent of at least one supplemental monomeric diol, based on the total weight of the thermoplastic polymer. In other embodiments, substantially no, or no, supplemental monomeric diols may be used, such that the total amount of residues of supplemental diols present in the thermoplastic polymer can be less than 0.5, or less than about 0.1, based on the total weight of the thermoplastic polymer.

In some embodiments, the thermoplastic polymer described herein may include residues of at least one supplemental diol in an amount in the range of from about 0.5 to about 20 weight percent, about 0.5 to about 18 weight percent, about 0.5 to about 15 weight percent, about 0.5 to about 12 weight percent, about 1 to about 20 weight percent, about 1 to about 18 weight percent, about 1 to about 15 weight percent, about 1 to about 12 weight percent, about 2 to about 20 weight percent, about 2 to about 18 weight percent, about 2 to about 15 weight percent, about 2 to about 12 weight percent, about 3 to about 20 weight percent, about 3 to about 18 weight percent, about 3 to about 15 weight percent, about 3 to about 12 weight percent, about 5 to about 20 weight percent, about 5 to about 18 weight percent, about 5 to about 15 weight percent, about 5 to about 12 weight percent, about 8 to about 20 weight percent, about 8 to about 18 weight percent, about 8 to about 15 weight percent, about 8 to about 12 weight percent, about 10 to about 20 weight percent, about 10 to about 18 weight percent, about 10 to about 15 weight percent, or about 10 to about 12 weight percent, based on the total weight of the polymeric polyester diol.

When used, the supplemental diol may include any suitable monomeric diol. The suitable monomeric diol may be the same as, or different than, one or more of the diols used to form the polymeric polyester diol as described above. Examples of monomeric diols suitable for use as the supplemental diol in the thermoplastic polymer may include, but are not limited to, 2,2'-bis[4-(2-hydroxyethoxy)phenyl]propane, 1,4-butanediol, tricyclodecane dimethanol, 2,2'-(1,4-phenylenebis(oxy))diethanol, 1,4-benzenedimethanol, 2,2-dimethyl-1,3-propanediol, 1,4-cyclohexanedimethanol, 1,3-cyclohexanedimethanol, 4,8-bis(hydroxymethyl)tricycle[5.2.1.02,6]decane, bis-4-(2-hydroxyethoxy)phenyl sulfone), spiroglycol, 2,2'-(1,4-phenylenebis (oxy))diethanol, 2,2'-(2,4,8,10-tetraoxaspiro(5,5)undecane-3,9-diyl)bis(2-methylpropan-1-ol), 2,6-decaline-dimethanol, 2,2,4,4-tetramethyl-1,3-cyclobutanediol, 1,4-cyclohexanediol, isosorbide, hydroquinone, neopentyl glycol, and combinations thereof. In some embodiments, the supplemental monomeric diol may be selected from the group consisting of 1,4-cyclohexanedimethanol, 1,4-cyclohexanediol, 2,6-decalinedimethanol, and combinations thereof. In one embodiment, the supplemental monomeric diol is 1,4-cyclohexanedimethanol.

According to some embodiments, the thermoplastic polymer described herein may include residues of at least one branching monomer. As used herein, the term "branching monomer" refers to a monomeric component including three or more reactive functional groups selected from the group consisting of carboxyl substituents, hydroxyl substituents, and combinations thereof. Examples of suitable branching monomers can include, but are not limited to, trimellitic acid, trimellitic anhydride, pyromellitic dianhydride, trimethylolpropane, glycerol, pentaerythritol, citric acid, tartaric acid, 3-hydroxyglutaric acid and the like. In some embodiments, the branching monomer may be selected from the group consisting of trimethylolpropane, glycerol, pentaerythritol, and combinations thereof. The branching monomer may be added to the reaction mixture or blended with the thermoplastic polymer in the form of a concentrate as described, for example, in U.S. Pat. Nos. 5,654,347 and 5,696,176.

If present, the combined amount of polymeric polyester multifunctional alcohols having a hydroxyl functionality of 2.2 or greater, branching monomers, and multifunctional isocyanates may be present in the thermoplastic polymer in amounts less than 2 weight percent, based on the total weight of the polymer. In some embodiments, the thermoplastic polymer of the present invention can include not more than 1.5, not more than about 1, not more than about 0.70, not more than about 0.50, or not more than about 0.25 weight percent of branching monomers, multifunctional isocyanates, and polymeric polyester multifunctional alcohols having a hydroxyl functionality of 2.2 or greater, based on the total weight of the polymer.

As described previously, the thermoplastic polymer of the present invention may include residues of at least one polymeric polyester diol and at least one monomeric isocyanate, optionally with one or more supplemental diols, branching monomers, and/or multifunctional isocyanates, as described above. According to some embodiments of the present invention, the thermoplastic polymer can exclude, or substantially exclude, other components in addition to those described above so that, for example, less than about 20, less than about 15, less than about 10, less than about 5, less than about 3, less than about 1, or less than about 0.5 weight percent of the total residues of the inventive thermoplastic polymer can include residues of components other than the polymeric polyester diol, the monomeric isocyanate, and, if present, the supplemental diols, branching monomers, and multifunctional isocyanates described herein. In some embodiments, the thermoplastic polymers as described herein may consist essentially of, or consist of, the polymeric polyester diol, the monomeric isocyanate, and, if present, the supplemental diols, branching monomers, and multifunctional isocyanates.

Unlike conventional thermoset polymer resins, the thermoplastic polymer described herein may not be cross-linkable. Accordingly, the thermoplastic polymer of the present invention may include substantially no, or no, residues of a crosslinking agent. For example, the thermoplastic polymer described herein may include less than about 10, less than about 8, less than about 5, less than about 3, less than about 1, or less than about 0.5 weight percent of one or more cross-linking agents, based on the total weight of the polymer.

In certain embodiments, the thermoplastic polymers as described herein may have an isocyanate to polyol ratio, measured as the molar ratio of isocyanate to hydroxyl functional groups (NCO:OH) of at least about 1:1, at least about 1.01:1, at least about 1.025:1, at least about 1.05:1 and/or not more than about 1.25:1, not more than about 1.2:1, not more than about 1.15:1, or not more than about 1.1:1, or in the range of from about 1:1 to about 1.25:1, about 1:1 to about 1.2:1, about 1:1 to about 1.15:1, or about 1:1 to about 1.1:1, about 1.01:1 to about 1.25:1, about 1.01:1 to about 1.2:1, about 1.01:1 to about 1.15:1, about 1.01:1 to about 1.1:1, about 1.025:1 to about 1.25:1, about 1.025:1 to about 1.2:1, about 1.025:1 to about 1.15:1, about 1.025:1 to about 1.1:1, about 1.05:1 to about 1.25:1, about 1.05:1 to about 1.2:1, about 1.05:1 to about 1.15:1, about 1.05:1 to about 1.1:1.

According to embodiments of the present invention, the thermoplastic polymers described herein may have a glass transition temperature of at least about 70° C., measured using a Q2000 differential scanning calorimeter (DSC) available from TA Instruments according to ASTM method D-3418 at a scanning rate of 20° C./min. This is in contrast to many conventional thermoplastic polyurethane compositions, which typically have glass transition temperatures at or below room temperature. In some embodiments, the thermoplastic polymer of the present invention may have a glass transition temperature of at least about 25, at least about 50, at least about 75, at least about 80, at least about 85, at least about 90, at least about 95, at least about 100, at least about 105, at least about 110, at least about 115, at least about 120, at least about 125, at least about 130, at least about 135, at least about 140, at least about 145, at least about 150, at least about 155, or at least about 160° C. and/or not more than about 200, not more than about 195, not more than about 190, not more than about 185, not more than about 180, not more than about 170, not more than about 165, not more than about 160, not more than about 155, not more than about 150, or not more than about 145° C.

The thermoplastic polymer can have a glass transition temperature in the range of from about 25 to about 200° C., about 25 to about 195° C., about 25 to about 190° C., about 25 to about 185° C., about 25 to about 180° C., about 25 to about 175° C., about 25 to about 170° C., about 25 to about 165° C., about 25 to about 160° C., about 25 to about 155° C., about 25 to about 150° C., about 25 to about 145° C., about 50 to about 200° C., about 50 to about 195° C., about 50 to about 190° C., about 50 to about 185° C., about 50 to about 180° C., about 50 to about 175° C., about 50 to about 170° C., about 50 to about 165° C., about 50 to about 160° C., about 50 to about 155° C., about 50 to about 150° C., about 50 to about 145° C., about 70 to about 200° C., about 70 to about 195° C., about 70 to about 190° C., about 70 to about 185° C., about 70 to about 180° C., about 70 to about 175° C., about 70 to about 170° C., about 70 to about 165° C., about 70 to about 160° C., about 70 to about 155° C., about 70 to about 150° C., about 70 to about 145° C., about 75 to about 200° C., about 75 to about 195° C., about 75 to about 190° C., about 75 to about 185° C., about 75 to about 180° C., about 75 to about 175° C., about 75 to about 175° C., about 75 to about 165° C., about 75 to about 160° C., about 75 to about 155° C., about 75 to about 150° C., about 75 to about 145° C., about 80 to about 200° C., about 80 to about 195° C., about 80 to about 190° C., about 80 to about 185° C., about 80 to about 180° C., about 80 to about 175°

C., about 80 to about 180° C., about 80 to about 165° C., about 80 to about 160° C., about 80 to about 155° C., about 80 to about 150° C., about 80 to about 145° C., about 85 to about 200° C., about 85 to about 195° C., about 85 to about 190° C., about 85 to about 185° C., about 85 to about 180° C., about 85 to about 175° C., about 85 to about 185° C., about 85 to about 165° C., about 85 to about 160° C., about 85 to about 155° C., about 85 to about 150° C., about 85 to about 145° C., about 90 to about 200° C., about 90 to about 195° C., about 90 to about 190° C., about 90 to about 185° C., about 90 to about 180° C., about 90 to about 175° C., about 90 to about 190° C., about 90 to about 165° C., about 90 to about 160° C., about 90 to about 155° C., about 90 to about 150° C., about 90 to about 145° C., about 95 to about 200° C., about 95 to about 195° C., about 95 to about 190° C., about 95 to about 185° C., about 95 to about 180° C., about 95 to about 175° C., about 95 to about 195° C., about 95 to about 165° C., about 95 to about 160° C., about 95 to about 155° C., about 95 to about 150° C., about 95 to about 145° C., about 100 to about 200° C., about 100 to about 195° C., about 100 to about 190° C., about 100 to about 185° C., about 100 to about 180° C., about 100 to about 175° C., about 100 to about 1100° C., about 100 to about 165° C., about 100 to about 160° C., about 100 to about 155° C., about 100 to about 150° C., about 100 to about 145° C., about 105 to about 200° C., about 105 to about 195° C., about 105 to about 190° C., about 105 to about 185° C., about 105 to about 180° C., about 105 to about 175° C., about 105 to about 1105° C., about 105 to about 165° C., about 105 to about 160° C., about 105 to about 155° C., about 105 to about 150° C., about 105 to about 145° C., about 110 to about 200° C., about 110 to about 195° C., about 110 to about 190° C., about 110 to about 185° C., about 110 to about 180° C., about 110 to about 175° C., about 110 to about 1110° C., about 110 to about 165° C., about 110 to about 160° C., about 110 to about 155° C., about 110 to about 150° C., about 110 to about 145° C., about 115 to about 200° C., about 115 to about 195° C., about 115 to about 190° C., about 115 to about 185° C., about 115 to about 180° C., about 115 to about 175° C., about 115 to about 1115° C., about 115 to about 165° C., about 115 to about 160° C., about 115 to about 155° C., about 115 to about 150° C., about 115 to about 145° C., about 120 to about 200° C., about 120 to about 195° C., about 120 to about 190° C., about 120 to about 185° C., about 120 to about 180° C., about 120 to about 175° C., about 120 to about 1120° C., about 120 to about 165° C., about 120 to about 160° C., about 120 to about 155° C., about 120 to about 150° C., about 120 to about 145° C., about 125 to about 200° C., about 125 to about 195° C., about 125 to about 190° C., about 125 to about 185° C., about 125 to about 180° C., about 125 to about 175° C., about 125 to about 1125° C., about 125 to about 165° C., about 125 to about 160° C., about 125 to about 155° C., about 125 to about 150° C., about 125 to about 145° C., about 130 to about 200° C., about 130 to about 195° C., about 130 to about 190° C., about 130 to about 185° C., about 130 to about 180° C., about 130 to about 175° C., about 130 to about 1130° C., about 130 to about 165° C., about 130 to about 160° C., about 130 to about 155° C., about 130 to about 150° C., about 130 to about 145° C., about 135 to about 200° C., about 135 to about 195° C., about 135 to about 190° C., about 135 to about 185° C., about 135 to about 180° C., about 135 to about 175° C., about 135 to about 1135° C., about 135 to about 165° C., about 135 to about 160° C., about 135 to about 155° C., about 135 to about 150° C., about 135 to about 145° C., about 140 to about 200° C., about 140 to about 195° C., about 140 to about 190° C., about 140 to about 185° C., about 140 to about 180° C., about 140 to about 175° C., about 140 to about 1140° C., about 140 to about 165° C., about 140 to about 160° C., about 140 to about 155° C., about 140 to about 150° C., about 140 to about 145° C., about 145 to about 200° C., about 145 to about 195° C., about 145 to about 190° C., about 145 to about 185° C., about 145 to about 180° C., about 145 to about 175° C., about 145 to about 1145° C., about 145 to about 165° C., about 145 to about 160° C., about 145 to about 155° C., about 145 to about 150° C., about 150 to about 200° C., about 150 to about 195° C., about 150 to about 190° C., about 150 to about 185° C., about 150 to about 180° C., about 150 to about 175° C., about 150 to about 1150° C., about 150 to about 165° C., about 150 to about 160° C., about 150 to about 155° C., about 155 to about 200° C., about 155 to about 195° C., about 155 to about 190° C., about 155 to about 185° C., about 155 to about 180° C., about 155 to about 175° C., about 155 to about 1155° C., about 155 to about 165° C., about 155 to about 160° C., about 160 to about 200° C., about 160 to about 195° C., about 160 to about 190° C., about 160 to about 185° C., about 160 to about 180° C., about 160 to about 175° C., about 160 to about 1160° C., or about 160 to about 165° C.

In addition to a glass transition temperature within one or more ranges above, the thermoplastic polymer may also have a tensile modulus higher than most conventional thermoplastic polyurethanes, and other similar materials. For example, in some embodiments, the thermoplastic polymer of the present invention can have a tensile modulus greater than 1000 MPa, measured at a nominal strain rate of 0.1/min according to ASTM D-638. In embodiments, the tensile modulus of the inventive thermoplastic polymer described herein can be at least about 1250, at least about 1500, or at least about 2000 MPa and/or not more than about 5000, not more than about 4000, or not more than about 3000 MPa, or it can be in the range of from about 1000 to about 5000 MPa, about 1000 to about 4000 MPa, about 1000 to about 3000 MPa, about 1250 to about 5000 MPa, about 1250 to about 4000 MPa, about 1250 to about 3000 MPa, about 1500 to about 5000 MPa, about 1500 to about 4000 MPa, about 1500 to about 3000 MPa, about 2000 to about 5000 MPa, about 2000 to about 4000 MPa, or about 2000 to about 3000 MPa.

In embodiments of the invention, the thermoplastic polymer may also have a "lower process temperature" ($T_p$) that is closer to the glass transition temperature than it would be for traditional thermoplastic polyesters. As used herein, the term "lower process temperature" refers to the temperature below which the polymer's melt viscosity exceeds 10,000 poise (P). The lower process temperature is determined by measuring viscosity at a shear rate of 25 rad/sec as a function of temperature according to ASTM D-4440 using an oscillating dynamic mechanical rheometer. For most conventional polyesters, the change in viscosity as a function of temperature is such that conventional polyesters must be processed at least 140° C. above $T_g$ (i.e., the $T_p$-$T_g$ for conventional polyesters is greater than or equal to about 140° C.). Because Tp cannot be any higher than the temperature at which significant thermal and oxidative degradation occurs, this places a restrictive upper limit on the $T_g$ of conventional polyesters. In contrast, the difference between the lower process temperature and the glass transition temperature ($T_p$-$T_g$) for thermoplastic polymers of the present invention are all less than about 135° C., which allows the Tg of these polymers to be much higher than the $T_g$ of conventional polyesters.

In certain embodiments, the difference between the lower process temperature and the glass transition temperature ($T_p-T_g$) for thermoplastic polymers of the present invention can be at least about 80, at least about 85, at least about 90, at least about 95, at least about 100, or at least about 105° C. Additionally, or in the alternative, in certain embodiments, the difference between the lower process temperature and the glass transition temperature ($T_p-T_g$) for thermoplastic polymers of the present invention can be not more than about 135, not more than about 130, not more than about 125, not more than about 120, not more than about 115, not more than about 110, not more than about 105, not more than about 100, not more than about 95, or not more than about 90° C.

In embodiments of the invention, the difference between the lower process temperature and the glass transition temperature ($T_p-T_g$) for thermoplastic polymers described herein can be in the range of from about 80 to about 135° C., about 80 to about 130° C., about 80 to about 125° C., about 80 to about 120° C., about 80 to about 115° C., about 80 to about 110° C., about 80 to about 105° C., about 80 to about 105° C., about 80 to about 100° C., about 80 to about 95° C., about 80 to about 90° C., about 85 to about 135° C., about 85 to about 130° C., about 85 to about 125° C., about 85 to about 120° C., about 85 to about 115° C., about 85 to about 110° C., about 85 to about 105° C., about 85 to about 105° C., about 85 to about 100° C., about 85 to about 95° C., about 85 to about 90° C., about 90 to about 135° C., about 90 to about 130° C., about 90 to about 125° C., about 90 to about 120° C., about 90 to about 115° C., about 90 to about 110° C., about 90 to about 105° C., about 90 to about 105° C., about 90 to about 100° C., about 90 to about 95° C., about 95 to about 135° C., about 95 to about 130° C., about 95 to about 125° C., about 95 to about 120° C., about 95 to about 115° C., about 95 to about 110° C., about 95 to about 105° C., about 95 to about 105° C., about 95 to about 100° C., about 100 to about 135° C., about 100 to about 130° C., about 100 to about 125° C., about 100 to about 120° C., about 100 to about 115° C., about 100 to about 110° C., about 100 to about 105° C., about 100 to about 105° C., about 105 to about 135° C., about 105 to about 130° C., about 105 to about 125° C., about 105 to about 120° C., about 105 to about 115° C., or about 105 to about 110° C.

The molecular weight of the thermoplastic polymer can vary and may be selected, at least in part, based on the desired end use or application of the reaction system. For example, in some embodiments, the thermoplastic polymer described herein can have a number average molecular weight of at least about 3,000, at least about 5,000, at least about 10,000, at least about 15,000, at least about 20,000, or at least about 25,000 Daltons, and/or not more than about 100,000, not more than about 90,000, not more than about 80,000, not more than about 70,000, not more than about 60,000, not more than about 50,000, not more than about 40,000, not more than about 35,000, not more than about 30,000, or not more than about 25,000 Daltons, measured by gel permeation chromatography (GPC) according to ASTM method D-5296 using HFIP/methylene chloride as a solvent in an Agilent 1100 Series GPC-SEC system with a refractive index detector calibrated to polystyrene standards.

In some embodiments, the molecular weight of the thermoplastic polymer can be in the range of from about 3,000 to about 100,000 Daltons, about 3,000 to about 90,000 Daltons, about 3,000 to about 80,000 Daltons, about 3,000 to about 70,000 Daltons, about 3,000 to about 60,000 Daltons, about 3,000 to about 50,000 Daltons, about 3,000 to about 40,000 Daltons, about 3,000 to about 35,000 Daltons, about 3,000 to about 30,000 Daltons, about 3,000 to about 25,000 Daltons, about 5,000 to about 100,000 Daltons, about 5,000 to about 90,000 Daltons, about 5,000 to about 80,000 Daltons, about 5,000 to about 70,000 Daltons, about 5,000 to about 60,000 Daltons, about 5,000 to about 50,000 Daltons, about 5,000 to about 40,000 Daltons, about 5,000 to about 35,000 Daltons, about 5,000 to about 30,000 Daltons, about 5,000 to about 25,000 Daltons, about 10,000 to about 100,000 Daltons, about 10,000 to about 90,000 Daltons, about 10,000 to about 80,000 Daltons, about 10,000 to about 70,000 Daltons, about 10,000 to about 60,000 Daltons, about 10,000 to about 50,000 Daltons, about 10,000 to about 40,000 Daltons, about 10,000 to about 35,000 Daltons, about 10,000 to about 30,000 Daltons, about 10,000 to about 25,000 Daltons, about 15,000 to about 100,000 Daltons, about 15,000 to about 90,000 Daltons, about 15,000 to about 80,000 Daltons, about 15,000 to about 70,000 Daltons, about 15,000 to about 60,000 Daltons, about 15,000 to about 50,000 Daltons, about 15,000 to about 40,000 Daltons, about 15,000 to about 35,000 Daltons, about 15,000 to about 30,000 Daltons, about 15,000 to about 25,000 Daltons, about 20,000 to about 100,000 Daltons, about 20,000 to about 90,000 Daltons, about 20,000 to about 80,000 Daltons, about 20,000 to about 70,000 Daltons, about 20,000 to about 60,000 Daltons, about 20,000 to about 50,000 Daltons, about 20,000 to about 40,000 Daltons, about 20,000 to about 35,000 Daltons, about 20,000 to about 30,000 Daltons, about 20,000 to about 25,000 Daltons, about 25,000 to about 100,000 Daltons, about 25,000 to about 90,000 Daltons, about 25,000 to about 80,000 Daltons, about 25,000 to about 70,000 Daltons, about 25,000 to about 60,000 Daltons, about 25,000 to about 50,000 Daltons, about 25,000 to about 40,000 Daltons, about 25,000 to about 35,000 Daltons, or about 25,000 to about 30,000 Daltons.

The thermoplastic polymer of the present invention may be formed according to any suitable method. For example, in some embodiments, the polymeric polyester diol and the monomeric isocyanate may be combined in a reaction zone, optionally in the presence of a catalyst and one or more other additives as described previously. The polymeric polyester diol, isocyanate, and other components, if present, may then react to form a thermoplastic polymer having a composition, glass transition temperature, modulus, and molecular weight within one or more of the ranges provided herein. When two or more polymeric polyester diols are used to form a thermoplastic polymer, the polymeric polyester diols can be combined prior to, or during, the reaction with the isocyanate monomer. The polymeric polyester diol and isocyanate starting materials of the thermoplastic polymer described herein may be reacted continuously in, for example, a single screw or twin screw extruder. Optionally, the reaction may be conducted in a batch or semi-batch reaction vessel.

In some embodiments, the temperature of the reaction can be at least about 200, at least about 220, at least about 230, at least about 240, at least about 250° C. and/or not more than about 340, not more than about 330, not more than about 320, not more than about 310, or not more than about 300° C., or the temperature can be in the range of from about 200 to about 340° C., about 200 to about 330° C., about 200 to about 320° C., about 200 to about 310° C., about 200 to about 300° C., about 220 to about 340° C., about 220 to about 330° C., about 220 to about 320° C., about 220 to about 310° C., about 200 to about 300° C., about 230 to about 340° C., about 230 to about 330° C., about 230 to about 320° C., about 230 to about 310° C., about 230 to about 300° C., about 240 to about 340° C., about 240 to about 330° C., about 240 to about 320° C., about 240 to about 310° C., about 240 to about 300° C., about 250 to about 340° C., about 250 to about 330° C., about 250 to about 320° C., about 250 to about 310° C., or about 250 to about 300° C.

As discussed above, the glass transition temperature of the inventive thermoplastic materials may be higher than conventional thermoplastic polyurethanes and polyesters and, as a result, the difference between the reaction temperature and the glass transition temperature of the resulting thermoplastic polymer may be less for the inventive thermoplastic resin than for other, conventional polymers. For example, in some embodiments, the difference between the glass transition temperature of the thermoplastic polymer of the present invention and the temperature at which the polymer was formed is not more than about 175, not more than about 160, not more than about 150, not more than about 135, not more than about 120, not more than about 100, not more than about 80, not more than about 70, not more than about 60, or not more than about 50° C. Similarly, in some embodiments, comparable differences between the average melt temperature and glass transition temperature of the thermoplastic polymer may also be observed during melt processing of the inventive thermoplastic resins.

Once formed, the thermoplastic polymer may be in any suitable solid shape or form and may have, for example, a total solids content of the thermoplastic polymer may be at least about 90, at least about 95, at least about 97, at least about 99, or at least about 99.5 weight percent, measured according to ASTM D-2369. Examples of suitable forms can include, but are not limited to, a bulk of polymeric particles or pellets, or as an extruded film or sheet. In embodiments of the invention, the thermoplastic polymer composition described herein may include little, or no, liquid component and may include, for example, less than about 5, less than about 3, less than about 1, or less than about 0.5 weight percent of a solvent, or other liquid-phase component, based on the total weight of the polymer composition. Thus, in some embodiments, the thermoplastic polymer described herein may not be suitable for use in applications requiring solvent- or aqueous-based coatings.

In embodiments of the invention, the thermoplastic polymer described herein is suitable for fabrication of many shaped articles, including, but not limited to, sheets, films, tubes, preforms, bottles, profiles, and other similar articles. Such articles may be produced from the thermoplastic resin according to various embodiments of the present invention using any suitable method. Examples of such methods, depending on the type of shaped article, include, but are not limited to, extrusion, calendaring, thermoforming, blow molding, extrusion blow molding, injection molding, reactive injection molding, compression molding, casting, drafting, tentering, or blowing.

The following examples are given to illustrate the invention and to enable any person skilled in the art to make and use the invention. It should be understood, however, that the invention is not to be limited to the specific conditions or details described in these examples. The patentable scope of the invention is defined by the claims, and may include other examples that occur to those skilled in the art.

EXAMPLES

Example 1

Several isocyanate-modified thermoplastic polymers were formed according to the following general procedure. First, at least one monomeric diacid and at least one monomeric diol, of types and in amounts as summarized in Table 2, below, were charged to a 500 mL single neck round bottom flask equipped with a metal stirrer. The amounts in Table 2 are in mole %, based on 100 mole % for the acid component and 100 mole % for the diol component. The flask was also equipped with a stirrer adapter with a side arm condenser configured such that the side arm fed into a graduated cylinder connected to a vacuum trap. The vacuum trap was filled with a mixture of isopropanol and dry ice, and the graduated cylinder was placed in a dry ice bucket. The flask was vacuum purged to a pressure of 5 torr twice and then blanketed under nitrogen.

A separate metal bath was preset to a temperature of 220° C. and the flask was introduced into the metal bath. Upon insertion of the round bottom flask into the metal bath, the temperature set point was reduced to 190° C., and the stirrer was set to 50 rpm. When the contents of the flask were fully dissolved, the stirrer speed was increased to between 250 and 265 rpm. The temperature set point of the metal bath was also increased, if no condensation occurred, in 10° C. increments until a maximum bath temperature of between 230 and 245° C., depending on the polymeric polyester diol being formed, was achieved. Upon reaching the maximum bath temperature, the flask contents were stirred for one hour. Then, the pressure in the flask was reduced to 100 torr and held for another hour. Thereafter, the vacuum was released and the polyol was emptied onto an aluminum pan. The resulting cooled polymeric diol was then broken into small pieces and its glass transition temperature and number average molecular weight were determined by DSC and GPC, respectively, as described herein.

Table 1 provides a summary of the monomeric diacids and monomeric diols used to form the polymeric polyester diols listed in Table 2. Table 2 also provides the glass transition temperature and number average molecular weight of each of the polymeric polyester diols listed in Table 2.

TABLE 1

Summary of Diacids and Diols Used to Form Polyester Polymeric Diols

| Monomeric Diacids | |
|---|---|
| Diacid | Name |
| A1 | succinic acid |
| A2 | 1,4-cyclohexanedicarboxylic acid |
| A3 | adipic acid |
| A4 | dimethyl decahydronapthalene-2,6-dicarboxylate |
| A5 | terephthalic acid |
| A6 | dimethyl 2,6-napthalenedicarboxylate |
| A7 | dimethyl biphenyl 4,4'-dicarboxyate |
| A8 | Isophthalic acid |
| A9 | 4,4'-isopropylidenediphenoxy acetic acid |
| A10 | 4,4-sulfonyldibenzoic acid |
| A11 | 4,4-stilbenzenedicarboxylic acid |

| Monomeric Diols | |
|---|---|
| Diol | Name |
| D1 | 2,2,4,4-tetramethyl-1,3-cyclobutanediol |
| D2 | ethylene glycol |
| D3 | neopentyl glycol |
| D4 | 1,4-cyclohexanedimethanol |
| D5 | 2,6-decalinedimethanol |
| D6 | isosorbide |
| D7 | 2,2'-(1,4-phenylenebis(oxy))diethanol |

TABLE 1-continued

Summary of Diacids and Diols Used to Form
Polyester Polymeric Diols

| | | |
|---|---|---|
| D8 | 2,2-((sulfonylbis(4,1-phenylene))bis(oxy))diethanol | |
| D9 | 1,4-benzenedimethanol | |
| D10 | spiroglycol | |
| D11 | tricyclodecane dimethanol | |

TABLE 2

Composition & Properties of Polyester Polymer Diols

| Polymeric Polyester Diol | A1 | A2 | A3 | A4 | A5 | A6 | A7 | A8 | A9 | A10 | A11 | D1 | D2 | D3 | D4 | D5 | D6 | D7 | D8 | D9 | D10 | D11 | T$_g$ (°C.) | M$_n$ (Daltons) |
|---|---|---|---|---|---|---|---|---|---|---|---|---|---|---|---|---|---|---|---|---|---|---|---|---|
| PPD-01 | 100 | | | | | | | | | | | 100 | | | | | | | | | | | 12.2 | 1170 |
| PPD-02 | | 100 | | | | | | | | | | 100 | | | | | | | | | | | −32.4 | 1196 |
| PPD-03 | | | 100 | | | | | | | | | 100 | | | | | | | | | | | 40.6 | 977 |
| PPD-04 | | | | 100 | | | | | | | | 100 | | | | | | | | | | | 145.1 | 3099 |
| PPD-05 | | | | | 100 | | | | | | | 20 | 80 | | | | | | | | | | 53.5 | 1394 |
| PPD-06 | | | | | 100 | | | | | | | 31 | 69 | | | | | | | | | | 66.1 | 2078 |
| PPD-07 | | | | | | 100 | | | | | | 69 | 31 | | | | | | | | | | 84.5 | 1254 |
| PPD-08 | | | | | 100 | | | | | | | 31 | 44 | 25 | | | | | | | | | 49.4 | 1081 |
| PPD-09 | | | | | 100 | | | | | | | 30 | | | | 70 | | | | | | | 73.6 | 571 |
| PPD-10 | | | | | | 100 | | | | | | 70 | | | | 30 | | | | | | | 83.8 | 1224 |
| PPD-11 | | | | | | 50 | 50 | | | | | 31 | 69 | | | | | | | | | | 97.7 | 1870 |
| PPD-12 | | | | | 100 | | | | | | | | | | | 100 | | | | | | | 57.4 | 1081 |
| PPD-13 | | | | | | 100 | | | | | | | | | | 100 | | | | | | | 77.9 | 573 |
| PPD-14 | | | | | | 100 | | | | | | | | | | 100 | | | | | | | 72.1 | 507 |
| PPD-15 | | | | | | | 100 | | | | | | | | | 100 | | | | | | | 81.4 | 534 |
| PPD-16 | | | | | | 100 | | | | | | 30 | | | | 70 | | | | | | | 107.8 | 570 |
| PPD-17 | | | | | | 100 | | | | | | 70 | | | | 30 | | | | | | | 99.1 | 774 |
| PPD-18 | | 100 | | | | | | | | | | | | | 100 | | | | | | | | 12.8 | 908 |
| PPD-19 | | 100 | | | | | | | | | | | | | 100 | | | | | | | | no T$_g$ | 1102 |
| PPD-20 | | | | | 100 | | | | | | | 69 | | | 31 | | | | | | | | 39.0 | 1317 |
| PPD-21 | | | | | 100 | | | | | | | 44 | | 25 | 31 | | | | | | | | 39.2 | 1214 |
| PPD-22 | | | | | 100 | | | | | | | 60 | | | 40 | | | | | | | | 93.1 | 2004 |
| PPD-23 | | | | 100 | | | | | | | | 69 | | | 31 | | | | | | | | 43.2 | 2318 |
| PPD-24 | | | | | 25 | | 75 | | | | | 69 | | | 31 | | | | | | | | 75.9 | 1533 |
| PPD-25 | | | | | | 25 | 75 | | | | | | | | 31 | 69 | | | | | | | 60.9 | 909 |
| PPD-26 | | | | | | 50 | | | | | | | | | 31 | 69 | | | | | | | 50.9 | 1845 |
| PPD-27 | | | | | 100 | | | | | | | | | | 31 | 69 | | | | | | | 69.1 | 875 |
| PPD-28 | | | | | 100 | | | | | | | | 69 | | 31 | | | | | | | | 23.6 | 930 |
| PPD-29 | | | | | 100 | | | | | | | | | | 31 | | 69 | | | | | | 63.6 | 780 |
| PPD-30 | | | | | 100 | | | | | | | | | | 31 | | | 69 | | | | | 23.6 | 776 |
| PPD-31 | | | | | 100 | | | | | | | | | | 31 | | | | 69 | | | | 48.5 | 527 |
| PPD-32 | | | | | 75 | | 25 | | | | | | | | 31 | | | | | 69 | | | 37.7 | 597 |
| PPD-33 | | | | | 100 | | | | | | | | | | 31 | | | | | | 69 | | 39.9 | 793 |
| PPD-34 | | | | | 90 | | | 10 | | | | | 69 | | 31 | | | | | | | | 58.6 | 787 |
| PPD-35 | | | | | 75 | 25 | | | | | | | | | 31 | | | | | | | 69 | 29.5 | 442 |
| PPD-36 | | | | | 50 | 50 | | | | | | | 69 | | 31 | | | | | | | | 60.4 | 1761 |
| PPD-37 | | | | | 75 | 25 | | | | | | | 69 | | 31 | | | | | | | | 64.6 | 468 |
| PPD-38 | | 25 | | | 75 | | | | | | | | 69 | | 31 | | | | | | | | 23.8 | 1153 |
| PPD-39 | | | | | 75 | | | | 25 | | | | 69 | | 31 | | | | | | | | 66.7 | 2992 |
| PPD-40 | | | | | 75 | | | | | 25 | | | 69 | | 31 | | | | | | | | 29.5 | 875 |
| PPD-41 | | | | | 75 | | | | | | 25 | | 69 | | 31 | | | | | | | | 50.1 | 1205 |
| PPD-42 | | | | | 25 | | | | | | | | 69 | | 31 | | | | | | | | −3.9 | 448 |
| PPD-43 | | | | | | 75 | | | | | | | 69 | | 31 | | | | | | | | 49.8 | 566 |
| PPD-44 | | | | | 100 | | | | | | | 30 | | | | 70 | | | | | | | 77.1 | 1221 |

TABLE 2-continued

Composition & Properties of Polyester Polymer Diols

| Polymeric Polyester Diol | Acid Component | | | | | | | | | | | Diol Component | | | | | | | | | | | $T_g$ (° C.) | $M_n$ (Daltons) |
| --- | --- | --- | --- | --- | --- | --- | --- | --- | --- | --- | --- | --- | --- | --- | --- | --- | --- | --- | --- | --- | --- | --- | --- | --- |
| | A1 | A2 | A3 | A4 | A5 | A6 | A7 | A8 | A9 | A10 | A11 | D1 | D2 | D3 | D4 | D5 | D6 | D7 | D8 | D9 | D10 | D11 | | |
| PPD-45 | | | | | | 100 | | | | | | 30 | | | | 70 | | | | | | | 101.5 | 1368 |
| PPD-46 | | | | | | | 100 | | | | | 70 | | | | 30 | | | | | | | 122.8 | 1955 |
| PPD-47 | | | | | 100 | | | | | | | | | | 15 | 85 | | | | | | | 43.6 | 614 |
| PPD-48 | | | | | | 100 | | | | | | | | | 15 | 85 | | | | | | | 60.2 | 743 |
| PPD-49 | | | | | | 100 | | | | | | | | | | 100 | | | | | | | 70.5 | 757 |
| PPD-50 | | | | | | 100 | | | | | | 30 | 70 | | | | | | | | | | 108.8 | 1415 |

Next, several of the polymeric polyester diols listed in Table 2, above, were used to form isocyanate-modified thermoplastic polymers according to the following procedure.

A certain amount, depending on the specific composition of the polymer being formed, of one of the polymeric polyester diols shown in Table 2 was added to a 500-mL round bottom flask equipped with heating and stirring capabilities. For thermoplastic polymers that further include a supplemental diol, an appropriate amount of supplemental diol was also added to the flask. The contents of the flask were then heated to a temperature of 230° C. and held until all of the contents were fully melted, whereupon the contents were then stirred to promote thorough mixing. Solid flake 4,4'-methylene diphenyl diisocyanate (MDI) was then added to the reaction mixture, along with any catalysts, if used, and the contents were stirred vigorously until the contents were too viscous to stir. At that point, the flask was allowed to cool to room temperature, whereupon the contents of the flask were removed by breaking the flask and cutting the polymer away from the stirrer. The relative amounts of each component in wt % are shown in Table 3.

The glass transition temperature and number average molecular weight of each polymer sample in this and all subsequent examples were measured according to the procedures described herein. Table 3, below, summarizes the compositions of several isocyanate-modified thermoplastic polymers prepared according to this procedure, as well as the glass transition temperature and number average molecular weight measured for each polymer.

TABLE 3

Compositions and Properties of Isocyanate-Modified Thermoplastic Polymers

| Polymer | Polymeric Polyester Diol Type | Amount (wt %) | Amount of MDI (wt %) | Supplemental Monomeric Diol Type | Amount (wt %) | NCO:OH Ratio | $T_g$ (° C.) | $M_n$ (Daltons) |
|---|---|---|---|---|---|---|---|---|
| P-01 | PPD-01 | 82.5 | 17.5 | — | 0 | 1.00 | 77.16 | 12,467 |
| P-02 | PPD-01 | 71 | 24 | CHDM | 5.1 | 1.00 | 88.7 | 16,562 |
| P-03 | PPD-02 | 82.6 | 17.4 | — | 0 | 1.00 | 26.63 | 9680 |
| P-04 | PPD-02 | 71.2 | 23.7 | CHDM | 5.1 | 1.00 | 39.75 | 11992 |
| P-05 | PPD-03 | 78.8 | 21.2 | — | 0 | 1.05 | 128.31 | 8,895 |
| P-06 | PPD-04 | 92.2 | 7.8 | — | 0 | 1.05 | 186.8 | 7,245 |
| P-07 | PPD-05 | 84.2 | 15.8 | — | 0 | 1.05 | 92.57 | 8,271 |
| P-08 | PPD-06 | 88.8 | 11.2 | — | 0 | 1.05 | 109.16 | 21,814 |
| P-09 | PPD-07 | 82.7 | 17.3 | — | 0 | 1.05 | 107.68 | 9,198 |
| P-10 | PPD-08 | 80.4 | 19.6 | — | 0 | 1.05 | 104.23 | 13,662 |
| P-11 | PPD-09 | 68.5 | 31.5 | — | 0 | 1.05 | 152.2 | 5,108 |
| P-12 | PPD-10 | 82.3 | 17.7 | — | 0 | 1.05 | 163.87 | 11,406 |
| P-13 | PPD-11 | 87.4 | 12.6 | — | 0 | 1.08 | 134.42 | 9,555 |
| P-14 | PPD-12 | 80.4 | 19.6 | — | 0 | 1.05 | 144.22 | 9,810 |
| P-15 | PPD-13 | 68.8 | 31.2 | — | 0 | 1.04 | 138.17 | 3,479 |
| P-16 | PPD-14 | 65.9 | 34.1 | — | 0 | 1.05 | 128.65 | 4,682 |
| P-17 | PPD-15 | 67 | 33 | — | 0 | 1.05 | 127.68 | 5,511 |
| P-18 | PPD-16 | 68.6 | 31.4 | — | 0 | 1.05 | 164.48 | 5,502 |
| P-19 | PPD-17 | 74.8 | 25.2 | — | 0 | 1.04 | 170.87 | 7,505 |
| P-20 | PPD-18 | 78.4 | 21.6 | — | 0 | 1.00 | 76.49 | 12,479 |
| P-21 | PPD-18 | 71 | 25.6 | CHDM | 3.4 | 1.00 | 86.6 | 13,365 |
| P-22 | PPD-19 | 81.6 | 18.4 | — | 0 | 1.00 | 115.14 | 22,218 |
| P-23 | PPD-20 | 83.4 | 16.6 | — | 0 | 1.05 | 97.46 | 19,378 |
| P-24 | PPD-20 | 65 | 26.7 | CHDM | 8.3 | 1.00 | 99.43 | 19,275 |
| P-25 | PPD-21 | 82.3 | 17.7 | — | 0 | 1.04 | 97.85 | 33,705 |
| P-26 | PPD-22 | 88.9 | 11.1 | — | 0 | 1.00 | 123.77 | 20,763 |
| P-27 | PPD-23 | 89.8 | 10.2 | — | 0 | 1.05 | 77.38 | 16,725 |
| P-28 | PPD-24 | 85.4 | 14.6 | — | 0 | 1.05 | 110.93 | 9,071 |
| P-29 | PPD-25 | 77.6 | 22.4 | — | 0 | 1.05 | 143.57 | 15,418 |
| P-30 | PPD-26 | 87.6 | 12.4 | — | 0 | 1.05 | 124.55 | 31,906 |
| P-31 | PPD-27 | 76.9 | 23.1 | — | 0 | 1.05 | 127.5 | 9,542 |
| P-32 | PPD-28 | 78 | 22 | — | 0 | 1.05 | 81.75 | 17,348 |
| P-33 | PPD-29 | 74.8 | 25.2 | — | 0 | 1.05 | 116.44 | 6,405 |
| P-34 | PPD-30 | 74.7 | 25.3 | — | 0 | 1.05 | 117.17 | 16,643 |
| P-35 | PPD-31 | 66.7 | 33.3 | — | 0 | 1.05 | 122.96 | 5,442 |
| P-36 | PPD-32 | 69.4 | 30.6 | — | 0 | 1.05 | 123.87 | 4,824 |
| P-37 | PPD-33 | 75.1 | 24.9 | — | 0 | 1.05 | 121 | 9,690 |
| P-38 | PPD-34 | 75.9 | 24.1 | — | 0 | 1.00 | 136.78 | 9,233 |
| P-39 | PPD-35 | 62.7 | 37.3 | — | 0 | 1.05 | 103.35 | 4,327 |
| P-40 | PPD-36 | 65 | 25.5 | CHDM | 9.5 | 1.00 | 106.46 | 20,400 |
| P-41 | PPD-37 | 64.1 | 35.9 | — | 0 | 1.05 | 78.97 | 7,312 |
| P-42 | PPD-38 | 81.5 | 18.5 | — | 0 | 1.05 | 84.96 | 21,966 |
| P-43 | PPD-39 | 91.8 | 8.2 | — | 0 | 1.06 | 97.18 | 11,588 |
| P-44 | PPD-40 | 76.9 | 23.1 | — | 0 | 1.05 | 87.1 | 13,037 |
| P-45 | PPD-41 | 82 | 18 | — | 0 | 1.06 | 92.83 | 6,187 |
| P-46 | PPD-42 | 63 | 37 | — | 0 | 1.05 | 121.27 | 10,531 |
| P-47 | PPD-43 | 68.3 | 31.7 | — | 0 | 1.05 | 147.07 | 4,251 |
| P-48 | PPD-44 | 82.2 | 17.8 | — | 0 | 1.06 | 137.46 | 18,653 |
| P-49 | PPD-45 | 83.9 | 16.1 | — | 0 | 1.05 | 143.34 | 8,001 |
| P-50 | PPD-46 | 88.1 | 11.9 | — | 0 | 1.06 | 152.16 | 5,808 |
| P-51 | PPD-47 | 70.1 | 29.9 | — | 0 | 1.05 | 133.54 | 7,098 |

TABLE 3-continued

Compositions and Properties of Isocyanate-Modified Thermoplastic Polymers

| Polymer | Polymeric Polyester Diol Type | Amount (wt %) | Amount of MDI (wt %) | Supplemental Monomeric Diol Type | Amount (wt %) | NCO:OH Ratio | $T_g$ (° C.) | $M_n$ (Daltons) |
|---|---|---|---|---|---|---|---|---|
| P-52 | PPD-48 | 73.8 | 26.2 | — | 0 | 1.05 | 133.15 | 5,076 |
| P-53 | PPD-49 | 74.1 | 25.9 | — | 0 | 1.06 | 128.53 | 5,067 |
| P-54 | PPD-50 | 84.3 | 15.7 | — | 0 | 1.05 | 128.26 | 7,096 | nd = not determined

Example 2

Additional isocyanate-modified thermoplastic polymers were prepared according to the following procedure.

First, several polymeric polyester diols were prepared using a 3-L, 3-neck flask, equipped with a steel stirring rod, a 24/40 nitrogen inlet, a 45/50 stirring rod adapter, a 24/40 polymer thermocouple neck, two thermocouples, a reflux condenser, a polymer condenser arm with a 10/30 joint, a thermometer adapted to fit within the 10/30 joint, and a condensate collection cylinder with a 24/40 joint. The condenser was coupled to a cooling water system, and the 3-L flask was placed in a solid heating mantle instead of a metal bath.

To prepare each polymeric polyester diol, all of the monomers for a specified composition were introduced into the 3-L flask, along with FASTCAT 4100, a tin-based catalyst. Enough catalyst was added so that the reaction mixture included approximately 600 ppm of tin, based on the total weight of the reaction mixture. Where two monomeric diols were used, the diols were added in a ratio of about 1.33:1. The temperature of the reaction was computer-controlled. Initially, the temperature of the reaction melt was controlled using the heating mantle in order to melt the reactants by placing the mantle thermocouple at the bottom-center portion of the flask between the flask and the mantle. The temperature of the mantle was then set to 200° C. and the stirring speed was set to 70 rpm.

After the materials formed a slurry, the initial melt thermocouple was submerged in the melt and connected to the experimental set up, whereafter the reaction temperature was controlled by the melt thermocouple. When needed, a circulating bath with heating oil and heating tape, each set to a temperature of approximately 135° C., were used to melt any sublimed 2,2,4,4-tetramethyl-1,3-cyclobutanediol and retain it within the flask. The heating oil was circulated through a reflux condenser and the heating tape was wrapped around exposed glassware near the top of the flask.

After the materials were completely melted, the temperature of the melt was steadily increased from 190° C. to about 230° C. over a period of approximately 3 hours. After achieving a temperature of 230° C., the melt was maintained at that temperature for approximately 3½ hours before being cooled and poured in a metal pan to be recovered. The resulting polymeric diol was then broken into small pieces and its glass transition temperature and number average molecular weight were determined by DSC and GPC, respectively.

Table 4, below, summarizes the glass transition temperature and number average molecular weight of each of the polymeric polyester diols formed as described above. The designations for types of monomeric acids and monomeric diols shown in Table 4 are consistent with those in Table 1, above. The amounts of each component are shown in Table 4 in mole %, based on 100 mole % of the acid component and 100 mole % of the diol component.

TABLE 4

Composition and Properties of Polymeric Polyester Diols

| Polymeric Polyester Diol | Acid Component | | | | Diol Component | | | $T_g$ (° C.) | $M_n$ (Daltons) |
|---|---|---|---|---|---|---|---|---|---|
| | A2 | A5 | A6 | A8 | D1 | D4 | D5 | | |
| PPD-51 | 100 | | | | 100 | | | 35.8 | 1216 |
| PPD-52 | 100 | | | | 100 | | | 19.1 | 974 |
| PPD-53 | | 100 | | | 80 | 20 | | 55.5 | 786 |
| PPD-54 | | 100 | | | 90 | 10 | | 62.2 | 888 |
| PPD-55 | | 75 | 25 | | 100 | | | 89.1 | 1237 |
| PPD-56 | | 100 | | | 100 | | | 64.0 | 799 |
| PPD-57 | | 75 | | 25 | 100 | | | 86.3 | 1311 |
| PPD-58 | | | 100 | | 70 | | 30 | 97.9 | 1274 |
| PPD-59 | | 100 | | | 70 | | 30 | 81.8 | 1091 |
| PPD-60 | | | 100 | | 70 | 30 | | 116.3 | 1795 |

Several additional isocyanate-modified thermoplastic polymers were then formed from the polymeric polyester diols shown in Table 4 above, in a similar manner as described above in Example 1. The glass transition temperature and number average molecular weight of each of the resulting thermoplastic polymers was measured, and the results, along with the compositions of each polymer, are summarized in Table 5, below.

TABLE 5

Compositions and Properties of Thermoplastic Polymers

| Polymer | Polymeric Polyester Diol Type | Amount (wt %) | Amount of MDI (wt %) | Supplemental Monomeric Diol Type | Amount (wt %) | NCO:OH Ratio | $T_g$ (° C.) | $M_n$ (Daltons) |
|---|---|---|---|---|---|---|---|---|
| P-55 | PPD-51 | 82.9 | 17.1 | — | 0 | 1.00 | 124.4 | 20,102 |
| P-56 | PPD-52 | 64.1 | 28.8 | CHDM | 7.1 | 1.00 | 126.4 | 13,829 |

TABLE 5-continued

Compositions and Properties of Thermoplastic Polymers

| Polymer | Polymeric Polyester Diol Type | Amount (wt %) | Amount of MDI (wt %) | Supplemental Monomeric Diol Type | Amount (wt %) | NCO:OH Ratio | $T_g$ (° C.) | $M_n$ (Daltons) |
|---|---|---|---|---|---|---|---|---|
| P-57 | PPD-53 | 75.6 | 24.4 | — | 0 | 1.02 | 164.5 | 9,543 |
| P-58 | PPD-54 | 76.9 | 23.1 | — | 0 | 1.06 | 175.4 | 8,976 |
| P-59 | PPD-55 | 82.4 | 17.6 | — | 0 | 1.05 | 179.97 | 11,866 |
| P-60 | PPD-56 | 75.3 | 24.7 | — | 0 | 1.05 | 177.2 | 11,112 |
| P-61 | PPD-57 | 83.3 | 16.7 | — | 0 | 1.05 | 167.3 | 12,916 |
| P-62 | PPD-58 | 82.8 | 17.2 | — | 0 | 1.06 | 142.87 | 5,311 |
| P-63 | PPD-59 | nd | nd | — | 0 | nd | 159.5 | nd |
| P-64 | PPD-60 | 87.2 | 12.8 | — | 0 | 1.05 | 159.57 | 6,195 | nd = not determined

Example 3

Several additional isocyanate-modified thermoplastic polymers were prepared according to the following procedure.

A polymeric polyester diol was prepared using a 4-L Parr 4551 pressure vessel, a reflux condenser, and a water-cooled condenser. To form the polymeric polyester diol, 625.4 grams of terephthalic acid (TPA), 208.27 grams of isophthalic acid (IPA) or dimethyl 2,6-napthalenedicarboxylate, 565.77 grams of ethylene glycol (EG), and 231.3 grams of 1,4-cyclohexanedimethanol (CHDM) were charged to a metal beaker, along with 19.12 grams of titanium catalyst in ethylene glycol. The ethylene glycol was charged at an excess of about 100 percent. The concentration of the titanium metal was approximately 50 ppm, based on the total weight of the reaction mixture. The reaction mixture was stirred on a hot plate set to a temperature of 85° C. and formed a slurry. Thereafter, the resulting mixture was charged by vacuum into the Parr vessel and the temperature of the reactor was set to 170° C. before an automatic heating profile was used to heat the mixture. The stirring speed was initially set at 150 rpm.

After the oligomeric polyester diol had been formed, the glycol-to-acid molar ratios were measured by NMR, and the amount of excess ethylene glycol to be removed in order to achieve the target molecular weight was calculated. The oligomer was added to a 3-L, 3 neck flask and heated to a temperature of 230° C., whereupon the pressure in the flask was reduced to 50 torr. The excess ethylene glycol removed and recovered via passage through the water-cooled condenser was measured in a graduated cylinder and, upon reaching the target amount of recovered ethylene glycol, the resulting polymeric melt was poured out of the flask into a metal pan and cooled. The resulting polymeric diol was then broken into small pieces and its glass transition temperature and number average molecular weight were determined by DSC and GPC, respectively.

Table 6, below, summarizes the glass transition temperature and number average molecular weight of each of the polymeric polyester diols formed as described above. The designations for types of monomeric acids and monomeric diols shown in Table 6 are consistent with those in Table 1, above. The amounts of each component are shown in Table 6 in mole %, based on 100 mole % of the acid component and 100 mole % of the diol component.

TABLE 6

Compositions and Properties of Polymeric Polyester Diols

| Polymeric Polyester Diol | Acid Component | | | Diol Component | | $T_g$ (° C.) | $M_n$ (Daltons) |
|---|---|---|---|---|---|---|---|
| | A5 | A6 | A8 | D2 | D4 | | |
| PPD-61 | 75 | | 25 | 69 | 31 | 29.6 | 917 |
| PPD-62 | 75 | 25 | | 69 | 31 | 31.7 | 671 |

Thereafter, several additional isocyanate-modified thermoplastic polymers were then formed in a similar manner as described above in Example 1. The glass transition temperature and number average molecular weight of each of the resulting thermoplastic polymers was measured, and the results, along with the compositions of each polymer, are summarized in Table 7, below.

TABLE 7

Compositions and Properties of Thermoplastic Polymers

| Polymer | Polymeric Polyester Diol Type | Amount (wt %) | Amount of MDI (wt %) | Supplemental Monomeric Diol Type | Amount (wt %) | NCO:OH Ratio | $T_g$ (° C.) | $M_n$ (Daltons) |
|---|---|---|---|---|---|---|---|---|
| P-65 | PPD-61 | 77.7 | 22.3 | — | 0 | 1.05 | 98.42 | 25,939 |
| P-66 | PPD-61 | 64.6 | 28.9 | CHDM | 6.5 | 1 | 102.84 | 29,613 |
| P-67 | PPD-61 | 62.2 | 30.9 | BDM | 6.9 | 1.05 | 104.11 | 31,383 |
| P-68 | PPD-61 | 60.8 | 32.5 | CDO | 6.7 | 1.05 | 111.7 | 28,020 |
| P-69 | PPD-61 | 64.6 | 28.1 | DDM | 7.3 | 1.05 | 104.82 | 28,569 |
| P-70 | PPD-62 | 71.9 | 28.1 | — | 0 | 1.05 | 114.91 | 41,825 |

TABLE 7-continued

Compositions and Properties of Thermoplastic Polymers

| | Polymeric Polyester Diol | | Amount of MDI (wt %) | Supplemental Monomeric Diol | | Polymer Properties | | |
|---|---|---|---|---|---|---|---|---|
| Polymer | Type | Amount (wt %) | | Type | Amount (wt %) | NCO:OH Ratio | $T_g$ (° C.) | $M_n$ (Daltons) |
| P-71 | PPD-62 | 65.1 | 31 | CHDM | 3.9 | 1 | 112.66 | 27,500 |
| P-72 | PPD-62 | 60.7 | 32.6 | DDM | 6.7 | 1.05 | 117.57 | 19,725 |

Example 4

Several isocyanate-modified thermoplastic polymers were prepared in a pilot-scale facility according to the following procedure.

First, the reactor system was purged with nitrogen, and 544 pounds of a mixture of 90 weight percent 2,2,4,4-tetramethyl-1,3-cyclobutanediol in methanol was added to the reactor, while the nitrogen purge continued at 10 standard cubic feet per hour. The temperature of the reactor was increased to 120° C. and the agitator was started at a speed of 25 rpm. Once the internal temperature of the reactor reached 60° C., the stirrer was stopped. Upon reaching a temperature of 120° C., the reactor contents were then cooled to 100° C., and excess methanol was removed from the reactor traps. The remaining raw materials, which included 196 pounds of dimethyl terephthalate, 58 pounds of 1,4-cyclohexanedimethanol, 127 grams of FASTCAT 4100 catalyst, and 28 grams of manganese acetate catalyst, were charged to the reactor, and the temperature was increased to 230° C. When the reaction temperature reached 160° C., the agitator was again turned on at 25 rpm.

Once the reaction mixture reached a temperature of 230° C., the contents were held at a temperature of 230° C. and an agitator speed of 25 rpm for 4 hours. After 4 hours, the pressure of the reaction vessel was lowered to 100 mm Hg, whereupon the reactor contents were held at that temperature and pressure for another 2 hours. After 2 hours, the resulting polymeric polyester diol (PPD-63) was cooled to 180° C. and emptied into a suitable container for cooling. The polymeric polyester diol included an acid component having 100 mole percent residues of terephthalic acid, based on 100 mole % for the acid component, and a diol component having 30 weight percent residues of 2,2,4,4-tetramethyl-1,3-cyclobutanediol and 70 weight percent of residues of 1,4-cyclohexanedimethanol, based on 100 mole % for the diol component. The polymeric polyester diol had a glass transition temperature of 47.5° C. and a number average molecular weight of 742 Daltons.

The polymeric polyester diol was divided into several samples, and each sample was added to a 500-mL flask, along with 4,4'-methylene diphenyl diisocyanate (MDI) and, when used, 1,4-cyclohexanedimethanol (CHDM), 1,4-benzenedimethanol (BDM), 2,6-decaline-dimethanol (DDM), 1,4-cyclohexanediol (CDO) as a supplementary monomeric diol, to form several isocyanate-modified thermoplastic polymers in a similar manner as described in Example 1. The resulting thermoplastic polymers were recovered, and the glass transition temperature and number average molecular weight of each sample was measured as described above. The results of these measurements, along with the compositions of each polymer, are summarized in Table 8, below.

TABLE 8

Compositions and Properties of Thermoplastic Polymers

| | Polymeric Polyester Diol | | Amount of MDI (wt %) | Supplemental Monomeric Diol | | Polymer Properties | | |
|---|---|---|---|---|---|---|---|---|
| Polymer | Type | Amount (wt %) | | Type | Amount (wt %) | NCO:OH Ratio | $T_g$ (° C.) | $M_n$ (Daltons) |
| P-73 | PPD-63 | 74.8 | 25.2 | — | 0 | 1.00 | 164.8 | 23,443 |
| P-74 | PPD-63 | 59.8 | 33.5 | t-CHDM | 6.7 | 1.05 | 147.2 | 13,154 |
| P-75 | PPD-63 | 58.8 | 34.3 | BDM | 6.9 | 1.06 | 145.8 | 19,588 |
| P-76 | PPD-63 | 58.2 | 35.3 | CDO | 6.5 | 1.05 | 167.7 | 13,091 |
| P-77 | PPD-63 | 61.7 | 31.3 | DDM | 7.0 | 1.06 | 155.3 | 15,567 |

Example 5

Several isocyanate-modified thermoplastic polymers were prepared in a pilot-scale facility according to the following procedure. First, several additional polymeric polyester diols were prepared according to the procedure described in Example 4. Table 9, below, summarizes the glass transition temperature and number average molecular weight of each of the polymeric polyester diols. The designations for types of monomeric acids and monomeric diols shown in Table 9 are consistent with those in Table 1, above, and the amounts of the monomers are in mole %, based on 100 mole % for the acid component and 100 mole % for the diol component.

TABLE 9

Compositions and Properties of Polymeric Polyester Diols

| Polymeric Polyester Diol | Acid Component A5 | Diol Component D1 | Diol Component D4 | $T_g$ (° C.) | $M_n$ (Daltons) |
|---|---|---|---|---|---|
| PPD-64 | 100 | 70 | 30 | 47.8 | 720 |
| PPD-65 | 100 | 70 | 30 | 54.8 | 872 |
| PPD-66 | 100 | 70 | 30 | 64.6 | 1184 |

Each of the polymeric polyester diols listed in Table 9 was then combined with solid flake 4,4'-methylene diphenyl diisocyanate (MDI) and, when used, 1,4-cyclohexanedimethanol (CHDM), in a 40 mm twin screw extruder with an L/D of 52 in combination with a Gala underwater cutting system. The resulting thermoplastic polymer was produced at an average rate between 30 kg per hour and 100 kg per hour and the pellets were used to press films, mold parts, and evaluate various physical properties, including glass transition temperature and number average molecular weight. Table 10, below, summarizes the composition of each isocyanate-modified thermoplastic polymer formed according to this method, along with the results of the analyses.

TABLE 10

Compositions and Properties of Thermoplastic Polymers

| Polymer | Polymeric Polyester Diol Type | Amount (wt %) | Amount of MDI (wt %) | Supplemental Monomeric Diol Type | Amount (wt %) | NCO:OH Ratio | $T_g$ (° C.) | $M_n$ (Daltons) |
|---|---|---|---|---|---|---|---|---|
| P-78 | PPD-64 | 72.9 | 26.7 | — | 0 | 1.06 | 153.96 | 16,282 |
| P-79 | PPD-64 | 66.2 | 30.4 | CHDM | 3.4 | 1.06 | 155.45 | 15,552 |
| P-80 | PPD-65 | 61.7 | 31.5 | CHDM | 6.8 | 1.05 | 156.82 | 20,848 |
| P-81 | PPD-66 | 48.9 | 37.5 | CHDM | 13.6 | 1.08 | nd | 17,408 | nd = not determined

Example 6

Samples from select polymer materials formed in Examples 1 through 5, above, were ground and pressed for 3 minutes into 0.9 mm thick films on a Carver press at the temperatures summarized in Table 11, below. Modulus values were then measured according to ASTM D-638 at 1.4 mm/min crosshead speed (a nominal strain rate of 0.1/min) on ASTM D-638 Type V dogbone specimen cut from the pressed films. As shown in Table 11, below, each of the inventive polymers had modulus values greater than 1000 MPa, which confirms these are considered rigid materials.

TABLE 11

Modulus Values for Select Polymers

| Polymer | $T_g$ (° C.) | $M_n$ (Daltons) | Film Press Temperature (° C.) | Modulus (MPa) |
|---|---|---|---|---|
| P-02 | 88.7 | 16,562 | 205 | 1608 |
| P-08 | 109.2 | 21,814 | 205 | 1789 |
| P-22 | 115.1 | 22,218 | 220 | 1471 |
| P-23 | 97.5 | 19,378 | 205 | 1330 |
| P-24 | 99.4 | 19,275 | 180 | 1673 |
| P-25 | 97.9 | 33,705 | 205 | 1544 |
| P-26 | 123.8 | 20,763 | 220 | 1580 |
| P-29 | 143.6 | 15,418 | 240 | 1127 |
| P-30 | 124.6 | 31,906 | 220 | 1300 |
| P-32 | 81.8 | 17,348 | 180 | 1398 |
| P-40 | 106.5 | 20,400 | 205 | 1405 |
| P-42 | 85.0 | 21,966 | 180 | 1789 |
| P-44 | 87.1 | 13,037 | 180 | 1864 |
| P-48 | 137.5 | 18,653 | 220 | 1476 |
| P-65 | 98.4 | 25,939 | 205 | 1723 |
| P-66 | 102.8 | 29,613 | 205 | 1698 |
| P-67 | 104.1 | 31,383 | 205 | 1941 |
| P-68 | 111.7 | 28,020 | 220 | 1703 |
| P-69 | 104.8 | 28,569 | 205 | 1536 |
| P-70 | 114.9 | 41,825 | 220 | 1755 |
| P-71 | 112.7 | 27,500 | 220 | 1650 |
| P-72 | 117.6 | 19,725 | 220 | 1660 |
| P-73 | 164.8 | 23,443 | 240 | 1410 |
| P-75 | 145.8 | 19,588 | 240 | 1571 |
| P-76 | 167.7 | 13,091 | 240 | 1775 |
| P-77 | 155.3 | 15,567 | 240 | 1741 |
| P-79 | 155.5 | 15,552 | 240 | 1624 |
| P-80 | 156.8 | 20,848 | 240 | 1641 |
| P-81 | 146.6 | 17,408 | 240 | 1641 |

Example 7

The lower process temperature ($T_p$) for several of the polymers from Examples 1 through 5 above were determined by grinding a samples in an RDA melt rheometer at a shear rate of 25 radians/sec while increasing the temperature from 200° C. to 260° C. at a scan rate of 5° C./min. The results are summarized in Table 12, below. Additionally, the lower process temperature ($T_p$) values for several comparative thermoplastic polyesters (PC-A through PC-D) were also determined according to this method. PC-A was TRITAN® Copolyester TX1001, PC-B was TRITAN® Copolyester TX1500HF, PC-C was EASTAR® Copolyester 6763, and PC-D was EASTAR® Copolyester 5011 (all commercially available from Eastman Chemical Company).

The results for the comparative thermoplastic polyesters are also summarized in Table 12.

TABLE 12

Lower Process Temperature of Several Polymers

| Polymer | $M_n$ (Daltons) | $T_g$ (° C.) | $T_P$ (° C.) | $T_P - T_g$ (° C.) |
|---|---|---|---|---|
| PC-A | 22,915 | 78.6 | 217.7 | 139.1 |
| PC-B | 28,777 | 78.6 | 256.5 | 177.9 |
| PC-C | 25,175 | 106 | 257.3 | 151.3 |
| PC-D | 28,274 | 107.4 | 273.5 | 166.1 |
| P-08 | 21,814 | 109.2 | 220.1 | 110.9 |
| P-23 | 19,378 | 97.5 | 228.6 | 131.1 |
| P-30 | 31,906 | 124.6 | 250.1 | 125.6 |
| P-65 | 25,939 | 98.4 | 219.9 | 121.5 |
| P-68 | 28,020 | 111.7 | 228.1 | 116.4 |
| P-69 | 28,569 | 104.8 | 233.1 | 128.3 |
| P-70 | 41,825 | 114.9 | 230.7 | 115.8 |
| P-73 | 23,443 | 164.8 | 252.4 | 87.6 |
| P-80 | 20,848 | 156.8 | 248.6 | 91.8 |

Figure 2:
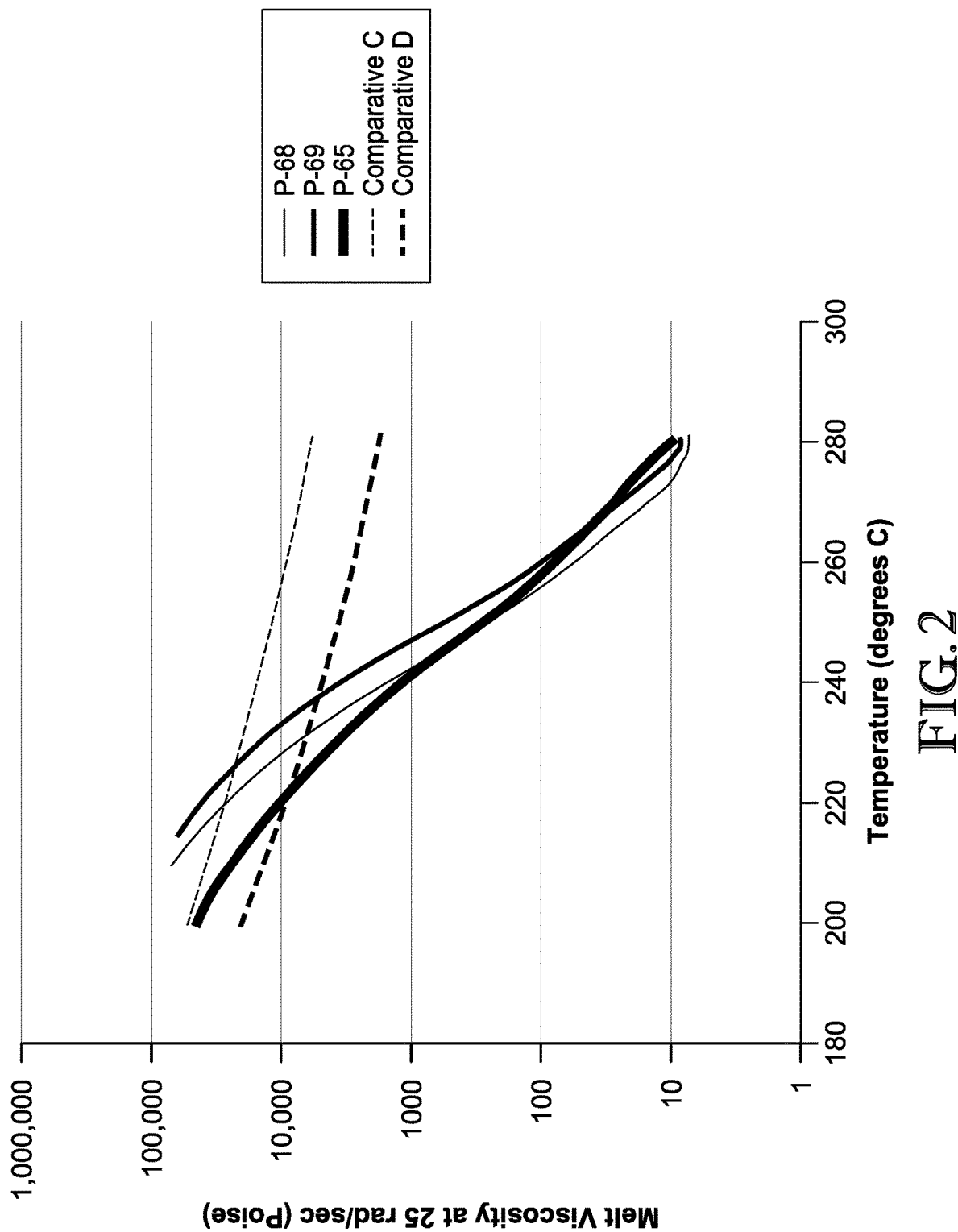
FIG. 2 is a graphical depiction of a temperature scan of several other inventive and comparative polymers as described in Example 7.

The full temperature scans of select inventive and comparative materials according to the above procedure are provided graphically in FIGS. 1 and 2. As shown in FIGS. 1 and 2, the viscosities of the thermoplastic polymers formed according to embodiments of the present invention change more drastically with temperature than traditional thermoplastic polyesters.

Definitions

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Equivalents to determine and assess the reasonably fair scope of the present invention as pertains to any apparatus not materially departing from but outside the literal scope of the invention as set forth in the following claims.

We claim:
1. A thermoplastic polymer comprising:
(a) residues of at least one linear polymeric polyester diol, wherein said linear polymeric polyester diol comprises residues of—
  (i) at least one monomeric diacid; and
  (ii) at least one monomeric diol,
wherein said linear polymeric polyester diol has a number average molecular weight of at least 400 Daltons; and
(b) residues of at least one diisocyanate monomer, wherein said residues of said diisocyanate monomer are present in said polymer in an amount of not more than 40 weight percent, based on the total weight of said polymer, wherein said polymer has a tensile modulus of at least 1000 MPa.

2. The polymer according to claim 1, wherein said polymer has a glass transition temperature of at least 70° C.

3. The polymer according to claim 1, wherein said linear polymeric polyester diol has a number average molecular weight in the range from 400 to 5000 Daltons.

4. The polymer according to claim 1, wherein said linear polymeric polyester diol has a glass transition temperature of at least −5° C.

5. The polymer according to claim 1, wherein said monomeric diol is selected from the group consisting of 2,2,4,4-tetramethyl-1,3-cyclobutanediol, isosorbide, 1,4-cyclohexanedimethanol, 1,3-cyclohexanedimethanol, ethylene glycol, 2,2' ((sulfonylbis(4,1-phenylene))bis(oxy)diethanol, 2,6-decalinedimethanol, tricyclodecane dimethanol, 1,4 benzene dimethanol, 2,2'-(1,4-phenylenebis (oxy))diethanol, 2,2'-(2,4,8,10-tetraoxaspiro(5,5)undecane-3,9-diyl)bis (2-methylpropan-1-ol), neopentyl glycol, and combinations thereof.

6. The polymer according to claim 5, wherein said monomeric diol is selected from the group consisting of 2,2,4,4-tetramethyl-1,3-cyclobutanediol, isosorbide, 1,4-cycohexanedimethanol, ethylene glycol, 2,6-decalinedimethanol, 1,4 benzene dimethanol, neopentyl glycol, and combinations thereof.

7. The polymer according to claim 1, wherein said linear polymeric polyester diol comprises residues of at least two monomeric diols.

8. The polymer according to claim 7, wherein said linear polymeric polyester diol comprises residues of at least two monomeric diols chosen from 2,2,4,4-tetramethyl-1,3-cyclobutanediol and at least one of 1,4-cyclohexanedimethanol or ethylene glycol.

9. The polymer according to claim 1, wherein said monomeric diacid is selected from the group consisting of terephthalic acid, dimethyl-terephthalic acid, 4,4,-sulfonyldibenzoic acid, resorcinol-o,o'diacetic acid, dimethylsuccinate, dimethyl biphenyl 4,4'-dicarboxylate, 1,4 cyclohexanedicarboxylic acid, 4,4'-stilbenedicarboxylic acid, 4,4'-isopropylidenediphenoxy acetic acid, dimethyl isophthalate, dimethyl 2,6-naphthalenedicarboxylate, dimethyl decahydronaphthalene-2,6-dicarboxylate, succinic acid, furan dicarboxylic acid, dimethyl furan dicarboxylate, and combinations thereof; or is selected from the group consisting of terephthalic acid, dimethyl-terephthalic acid, and combinations thereof.

10. The polymer according to claim 1 wherein said diisocyanate monomer comprises an aromatic diisocyanate monomer.

11. The polymer according to claim 10, wherein said diisocyanate monomer comprises 4,4'-methylene diphenyl diisocyanate.

12. The polymer according to claim 1, wherein said polymer further comprises at least 0.5 weight percent of residues of at least one supplemental monomeric diol, based on the total weight of the polymer.

13. The polymer according to claim 1, wherein said polymer further comprises at least 0.5 weight percent of residues of at least one supplemental monomeric diol, based on the total weight of the polymer, wherein said supplemental monomeric diol is selected from the group consisting of 2,2,4,4-tetramethyl-1,3-cyclobutanediol, isosorbide, 1,4-cyclohexanedimethanol, 1,3-cyclohexanedimethanol, ethylene glycol, 2,6-decalinedimethanol, tricyclodecane dimethanol, 1,4 benzene dimethanol, neopentyl glycol, and combinations thereof.

14. The polymer according to claim 1, wherein said polymer further comprises residues of at least one supplemental monomeric diol in an amount from 0.5 to 20 weight percent, based on the total weight of the polymer.

15. The polymer according to claim 1, further comprising residues of at least one branching monomer and/or at least one multifunctional isocyanate, wherein the total amount of said residues of said branching monomer and said multifunctional isocyanate present in said polymer are not more than 1 weight percent, based on the total weight of said polymer.

16. The polymer according to claim 1, wherein said polymer has a number average molecular weight of at least 10,000 Daltons, or in the range from 10,000 to 100,000 Daltons.

17. The polymer according to claim 1, wherein said monomeric diacid comprises residues of terephthalic acid and wherein said monomeric diol comprises residues of at least two monomeric diols selected from the group consisting of 2,2,4,4-tetramethyl-1,3-cyclobutanediol, isosorbide, 1,4-cyclohexanedimethanol, ethylene glycol, 2,6-decalinedimethanol, 1,4 benzene dimethanol, and combinations thereof, wherein said residues of at least one of said at least two monomeric diols is present in said polymer in an amount in the range of from 1 to 50 mole percent and wherein said residues of another of said at least two monomeric diols is present in said polymer in an amount in the range of from 50 to 99 mole percent, based on 100 mole percent for the diol component of said linear polymeric polyester diol, wherein said diisocyanate monomer comprises 4,4'-methylene diphenyl diisocyanate, and wherein said polymer further comprises up to 20 weight percent of residues of at least one supplemental monomeric diol, based on the total weight of the polymer, wherein said supplemental monomeric diol is selected from the group consisting of 2,2,4,4-tetramethyl-1,3-cyclobutanediol, isosorbide, 1,4-cyclohexanedimethanol, 1,3-cyclohexanedimethanol, ethylene glycol, 2,6-decalinedimethanol, tricyclodecane dimethanol, 1,4 benzene dimethanol, neopentyl glycol, and combinations thereof.

18. The polymer according to claim 1, wherein said linear polymeric polyester diol has a number average molecular weight in the range of from 500 to 2000 Daltons and a glass transition temperature of at least 0° C., wherein said polymer comprises 0.5 to 15 weight percent of residues of at least one supplemental monomeric diol, based on the total weight of the polymer.

19. The polymer according to claim 1, wherein the polymer has a lower process temperature ($T_p$) and said polymer has a glass transition temperature ($T_g$) and the difference between the lower process temperature ($T_p$) and the glass transition temperature ($T_g$) of said polymer is not more than 135° C., wherein $T_p$ is the temperature below which the polymer's melt viscosity exceeds 10,000 poise determined by measuring viscosity at a shear rate of 25 rad/sec as a function of temperature according to ASTM D-4440 using an oscillating dynamic mechanical rheometer.

20. A shaped article formed from the polymer according to claim 1.

21. A method for making a thermoplastic polymer comprising:
  combining at least one polymeric polyester diol, at least one monomeric diisocyanate, and, optionally, at least one supplemental monomeric diol in a reaction zone, optionally, in the presence of a catalyst; and
  reacting the combination in the reaction zone to form a thermoplastic polymer;
  wherein the thermoplastic polymer comprises:
  (a) residues of the at least one linear polymeric polyester diol, wherein said linear polymeric polyester diol comprises residues of—
    (i) at least one monomeric diacid; and
    (ii) at least one monomeric diol,
  wherein said linear polymeric polyester diol has a number average molecular weight of at least 400 Daltons; and
  (b) residues of the at least one diisocyanate monomer, wherein said residues of said diisocyanate monomer are present in said polymer in an amount of not more than 40 weight percent, based on the total weight of said polymer, and
  wherein said polymer has a tensile modulus of at least 1000 MPa.

* * * * *